US009248949B2

(12) United States Patent
Leifeld et al.

(10) Patent No.: US 9,248,949 B2
(45) Date of Patent: Feb. 2, 2016

(54) CARTRIDGE, A PHARMACEUTICAL DISPENSER CONTAINING THE CARTRIDGE, AND APPLICATIONS OF SAID CARTRIDGE AND SAID PHARMACEUTICAL DISPENSER

(75) Inventors: Sabine Leifeld, Berlin (DE); Tom Reinhold, Munster (DE); Sven Filler, Oranienburg (DE); Uwe Karla, Wandlitz (DE)

(73) Assignee: Bayer Intellectual Property GmbH, Monheim (DE)

( * ) Notice: Subject to any disclaimer, the term of this patent is extended or adjusted under 35 U.S.C. 154(b) by 352 days.

(21) Appl. No.: 13/131,113

(22) PCT Filed: Nov. 14, 2009

(86) PCT No.: PCT/EP2009/008125

§ 371 (c)(1), (2), (4) Date: Aug. 15, 2011

(87) PCT Pub. No.: WO2010/060548

PCT Pub. Date: Jun. 3, 2010

(65) Prior Publication Data

US 2011/0284568 A1 Nov. 24, 2011

(30) Foreign Application Priority Data

Nov. 26, 2008 (DE) ........................ 10 2008 059 673

(51) Int. Cl.
*G07F 11/16* (2006.01)
*B65G 59/00* (2006.01)
(Continued)

(52) U.S. Cl.
CPC ........... *B65D 83/0418* (2013.01); *A61J 7/0481* (2013.01); *B65D 2583/0409* (2013.01)

(58) Field of Classification Search
CPC .... B65G 83/04; B65G 83/0409; G07F 11/00; G07F 11/44; G07F 11/0092; G07F 11/165; G07F 11/42; G07F 11/32; A61J 1/03; A61J 7/0481; B65H 2220/02; B65H 2220/01; A47F 1/126; B65D 83/0418
USPC ............................ 221/263, 197, 198, 279, 93
See application file for complete search history.

(56) References Cited

U.S. PATENT DOCUMENTS

| | | | |
|---|---|---|---|
| 2,906,432 | A | 9/1959 | Martin |
| 2,960,259 | A | 11/1960 | Aveni |

(Continued)

FOREIGN PATENT DOCUMENTS

| | | | |
|---|---|---|---|
| DE | 3143953 | A1 | 5/1983 |
| DE | 8807774 | U1 | 9/1989 |

(Continued)

OTHER PUBLICATIONS

International Search Report of PCT/EP2009/008125 (Jan. 22, 2010).

*Primary Examiner* — Rakesh Kumar
(74) *Attorney, Agent, or Firm* — Aseem Mehta; Thomas C. Blankinship

(57) ABSTRACT

For safe storage and simple and safe administration of tablets T by a user, a cartridge 900 is provided that can be inserted into a medicament dispenser 1 for solid medicament portions T and that is designed with a reservoir for receiving the medicament portions T, and a medicament dispenser 1 containing this cartridge 900 is also provided. According to the invention, the cartridge 900 comprises a transport safety mechanism for preventing movement of the medicament portions T during storage and transport of the cartridge 900 . This transport safety mechanism is in particular a tolerance compensation plug 970 that sits with a frictional fit in the reservoir and that is movable in the axial direction. The cartridge 900 also contains a tablet rider 960 which is movable in the axial direction in the reservoir and which engages through at least one axial slit in the cartridge 900 and with which a force acting in the axial direction is transferred to the medicament portions (T) in the cartridge, thus serving to hold down a column-shaped arrangement of medicament portions (T).

16 Claims, 17 Drawing Sheets

(51) Int. Cl.

| | |
|---|---|
| ***B65H 3/00*** | (2006.01) |
| ***B65D 83/04*** | (2006.01) |
| ***A61J 7/04*** | (2006.01) |

(56) References Cited

U.S. PATENT DOCUMENTS

| | | | | |
|---|---|---|---|---|
| 3,032,179 | A * | 5/1962 | Menolasino | B65D 83/04 206/445 |
| 3,143,207 | A | 8/1964 | Wagner | |
| 3,270,915 | A | 9/1966 | Auer | |
| 3,300,087 | A * | 1/1967 | Kuypers | G01N 35/00 221/197 |
| 3,407,962 | A * | 10/1968 | Ragan | B65D 83/0409 221/303 |
| 3,480,181 | A * | 11/1969 | Bauer | B65D 83/00 221/255 |
| 3,591,043 | A | 7/1971 | Murphy | |
| 3,612,348 | A * | 10/1971 | Thomas | A61J 7/04 206/534 |
| 3,612,349 | A * | 10/1971 | Thomas | B65D 83/0409 221/232 |
| 3,680,736 | A | 8/1972 | Viessmann | |
| 3,688,945 | A * | 9/1972 | Harman, Jr. | B65D 83/0418 206/534 |
| 3,854,625 | A * | 12/1974 | Kuebler | 221/198 |
| 3,854,626 | A * | 12/1974 | Krechmar | 221/264 |
| 3,899,011 | A * | 8/1975 | Curtiss | C12M 99/00 141/325 |
| 4,151,931 | A * | 5/1979 | Scherer | B65D 83/0805 221/226 |
| 4,168,786 | A * | 9/1979 | Veiniere | B65D 83/0409 221/251 |
| 4,187,077 | A * | 2/1980 | Covington | G01N 35/00029 221/198 |
| 4,489,853 | A | 12/1984 | Korte et al. | |
| 4,984,709 | A * | 1/1991 | Weinstein | 221/7 |
| 4,986,442 | A | 1/1991 | Hinterreiter | |
| 5,048,720 | A | 9/1991 | Hoke | |
| 5,080,258 | A | 1/1992 | Hinterreiter | |
| 5,230,440 | A * | 7/1993 | Kurokawa | B65D 83/0418 221/198 |
| 5,366,113 | A | 11/1994 | Kim et al. | |
| 5,617,973 | A * | 4/1997 | Seto | G01N 35/00029 221/279 |
| 5,673,814 | A * | 10/1997 | Terashima | F16F 1/128 221/227 |
| 5,785,206 | A * | 7/1998 | Chan | G07F 11/14 221/198 |
| 5,871,831 | A | 2/1999 | Zeiter et al. | |
| 6,161,697 | A * | 12/2000 | Van Laeken | 206/499 |
| 6,409,020 | B1 | 6/2002 | Lo | |
| 6,889,869 | B2 * | 5/2005 | Hallin | B65D 83/0418 221/223 |
| 7,490,733 | B2 * | 2/2009 | Tagliareni | 221/46 |
| 8,308,026 | B2 * | 11/2012 | Rapko et al. | 221/267 |
| 2010/0286563 | A1 * | 11/2010 | Bryer | A61B 5/15146 600/583 |

FOREIGN PATENT DOCUMENTS

| | | | |
|---|---|---|---|
| DE | 10035599 | A1 | 2/2002 |
| DE | 202004012232 | U1 | 11/2004 |
| DE | 102009057264 | A1 | 9/2011 |
| EP | 000184742 | A3 * | 11/1985 |
| EP | 0184742 | A2 | 6/1986 |
| EP | 0583956 | A1 | 2/1994 |
| EP | 0916595 | A2 | 5/1999 |
| EP | 1038797 | A1 | 9/2000 |
| GB | 1 318 450 | A | 5/1973 |
| WO | 9011947 | A1 | 10/1990 |
| WO | 9311057 | A1 | 6/1993 |
| WO | 9406397 | A1 | 3/1994 |
| WO | 9621596 | A2 | 7/1996 |
| WO | 9830468 | A1 | 7/1998 |
| WO | 9908235 | A1 | 2/1999 |
| WO | 0040478 | A1 | 7/2000 |
| WO | 0066458 | A1 | 11/2000 |
| WO | 0198177 | A1 | 12/2001 |
| WO | 0201518 | A1 | 1/2002 |
| WO | 0232487 | A1 | 4/2002 |
| WO | 03073977 | A2 | 9/2003 |
| WO | 03088891 | A2 | 10/2003 |
| WO | 03092575 | A2 | 11/2003 |
| WO | 03092576 | A2 | 11/2003 |
| WO | 03092773 | A1 | 11/2003 |
| WO | 2004000703 | A1 | 12/2003 |
| WO | 2005028316 | A2 | 3/2005 |
| WO | 2005110335 | A1 | 11/2005 |
| WO | 2006044189 | A1 | 4/2006 |
| WO | 2008071233 | A1 | 6/2008 |
| WO | 2008074177 | A1 | 6/2008 |
| WO | 2009071415 | A1 | 6/2009 |
| WO | 2009080309 | A2 | 7/2009 |
| WO | 2009111554 | A1 | 9/2009 |
| WO | 2010060546 | A1 | 6/2010 |
| WO | 2010060547 | A1 | 6/2010 |
| WO | 2010060548 | A1 | 6/2010 |
| WO | 2010066456 | A1 | 6/2010 |
| WO | 2010066904 | A1 | 6/2010 |
| WO | 2011012282 | A2 | 2/2011 |
| WO | 2011054000 | A1 | 5/2011 |

* cited by examiner

CARTRIDGE, A PHARMACEUTICAL DISPENSER CONTAINING THE CARTRIDGE, AND APPLICATIONS OF SAID CARTRIDGE AND SAID PHARMACEUTICAL DISPENSER

DESCRIPTION

The invention relates to a cartridge for a medicament dispenser, in which solid medicament portions, for example tablets, are contained in a preferably column-shaped arrangement. The invention further relates to the medicament dispenser with the exchangeable cartridge contained therein, and to uses of the cartridge and of the medicament dispenser for storing and dispensing medicament portions, for example hormone preparations.

It is known to provide a user with solid medicament portions, for example tablets, in various types of packages. For example, solid medicines are very often supplied and each individually sealed in what are called blister packs (PTP: push-through pack), in which they are generally packed in closed cells. For this purpose, an in most cases transparent plastic film with receiving wells for the portions is welded to an aluminum foil, thus resulting in the formation of the individual cells in which the tablets are contained. Before being administered, the tablets are removed from the individual cells by being pushed out of the receiving wells and through the aluminum foil. This type of package is in widespread use, because each individual tablet is stored securely and is protected from harmful external influences. In another type of package, the solid medicines are made available in vials, in which the individual tablets are not individually packed. The users in this case have to remove the tablets individually by hand. In another type of package, the tablets, once again not individually packed, are located in a column-shaped arrangement in a tube. In this case too, the individual tablets are removed by hand. This is problematic in the sense that there is a risk of individual tablets falling out and thus being damaged or soiled. Moreover, the user is unable to check or see the number of tablets that have already been taken.

To permit convenient dosing and reliable medication and ensure careful handling of the medicament portions, it is advantageous if solid medicament portions packed in this way are made available, for administration by the user, in a medicament dispenser. In this case, the medicament portions are contained in the dispenser and can be dispensed from the dispenser as and when needed. The advantage of such systems is, among other things, that the medicament portions in the dispenser are protected from external influences, and there is the possibility of ensuring, by suitable means, that the portions are dispensed in a pre-dosed amount.

For the use of medicines that are packed in blister strips, WO 2005/028316 A2, for example, describes a dispenser which has a slit at one end for receiving a blister strip. In order to dispense individual tablets, the blister strip is pulled only partially out of the dispenser, such that only one individual tablet is exposed or only a small predetermined number of tablets is exposed. This is made possible by the blister strip having projections in which grippers engage in order to set a predefined advance movement upon withdrawal of the blister strip from the dispenser.

U.S. Pat. No. 6,409,020 B1 discloses a further dispenser containing a blister strip with blister cells arranged in a circle. The tablets in the blister cells are in principle accessible via a window on the upper face of the dispenser, but only when a user exerts pressure on at least one of the tabs, mounted laterally on the dispenser, of a strip which extends in the rest state across the window and thereby covers the tablets and protects them from unauthorized access. By contrast, when the user exerts pressure on the tab, the strip is bent upward and releases the tablets.

DE 8807774 U1 discloses a tablet dispenser for receiving a tablet reservoir, comprising a transport element and a slide for removing the tablets from the reservoir.

Moreover, DE 31 43 953 A 1 cites a dose dispenser for tablet-shaped products, in which these products are contained in a stack formation in a reservoir. The reservoir has, at one end, a stand with a slide rail mounted on the top face thereof and with an adapter part located above this, and, at the other end, it has a closure lid.

DE 42 30 452 A 1 discloses a container for storing and individually dispensing coated tablets that are received in supports. The support is in the form of an elongate tube in which the coated tablets are located. One end of the support is provided with a dispensing opening for the coated tablets, and the other end is closed with a stopper.

U.S. Pat. No. 5,080,258 discloses a dispenser for mouth-freshening lozenges and cough lozenges. The lozenges contained in this dispenser are stacked. The lozenges are forced upward in a guide by means of a spring force and in this way arrive at an ejector head, which has an ejection claw with which the lozenges are dispensed individually from the side of the dispenser.

EP 1189822 B1 discloses a tablet dispenser for medical purposes. It comprises a container which is in the form of a tube and in which the tablets are stacked and placed under a spring tension. The tablets are dispensed laterally from the dispenser by means of an ejection mechanism actuated from the head of the dispenser.

U.S. 2003/0132239 A1 discloses a magazine for receiving stacked tablets, for example mouth-freshening lozenges and cough lozenges, which magazine is provided for use in a tablet dispenser. The tablets are under spring tension in the magazine and are dispensed at the head of the dispenser, by means of an ejection mechanism, transversely with respect to the axis of the dispenser.

Moreover, U.S. Pat. No. 5,230,440 discloses a dispenser for tablets, for example contraceptives, ignition stones for lighters, or sweets, such as candies. The tablets or similar are contained as a stack in a sleeve, which can be inserted into the dispenser. The tablets or similar are dispensed laterally from the dispenser.

U.S. Pat. No. 5,048,720 describes a dispenser for candies or tablets, which has a housing and a magazine that can be locked in the latter. Two chambers are formed in the housing by the magazine. In one of the chambers, the candies or tablets are contained in the magazine. The candies or tablets are ejected laterally upon actuation of the dispenser, by means of a slide that can be actuated by the thumb being arranged on the magazine and being actuated and, consequently, an ejector for laterally dispensing an individual candy or tablet being actuated.

DE 1855071 U and DE 1863564 U disclose closure stoppers with a resilient spacer far tablet containers.

U.S. Pat. No. 3,270,915 A also describes a dispenser for pharmaceutical tablets that comprises a magazine for the tablets, an outer container, which receives the magazine, and a closure piece. The closure piece is screwed onto the lower end of the outer container. The tablets are stacked up in the magazine and loaded by a spring.

U.S. Pat. No. 3,854,626 A cites a dispenser for pills which has a reservoir for receiving the pills and in which the pills are stacked up and loaded by a spring.

DE 34 45 121 A 1 discloses a dispenser for individually dispensing tablets, comprising a tubular housing, with a reservoir for the tablets and with a dispensing opening at one end, and a mechanism for transporting the tablets. Extending to the side of the reservoir, there are toothed rods by means of which, during the ratchet advance movement, a pressure plate bearing against the last tablet is moved in the direction of a lid that lifts by a tablet thickness from an aperture edge of the housing.

U.S. Pat. No. 3,612,349 A cites a pill dispenser with a ram that works like a ratchet. The pills located in the dispenser are conveyed to a dispensing opening, by means of an operating element that extends into the interior of the dispenser, via a pressure piece. The pressure piece locks on the inside wall of the dispenser via resilient fingers, which engage in ratchet teeth on the inside wall of the interior.

U.S. Pat. No. 5,366,112 describes a dispenser for mouth-freshening lozenges and cough lozenges, in which the lozenges are stacked. The lozenges are pressed upward by a spring force and dispensed individually by an ejector head with ejector claw. The lozenges are located in a magazine. To apply the spring force to the lozenges, a spring-tensioned arm engages through the magazine and presses the lozenges in the magazine upward to the ejector head. As has been indicated in relation to U.S. Pat. No. 5,080,258, the tablets are dispensed from the side of the dispenser.

In most of the known medicament dispensers listed above, it is not specified how the tablets, lozenges, candies or the like are introduced into the dispenser. It is true that U.S. Pat. No. 5,230,440 states that the sleeve containing the tablets or the like is exchangeable and is inserted into a cavity in the dispenser. Moreover, U.S. Pat. No. 5,048,720 states that a magazine containing the candies or tablets is inserted into a housing. It has been found, however, that the use of such dispensers is problematic, especially when used by persons with visual impairment or in poor lighting conditions, because the ejected tablets or the like cannot in all cases be caught by the users, and instead the tablets or the like fall to the ground and are lost. Especially when the dispenser is used to dispense small tablets, it can happen that the person using it is uncertain whether or not a tablet has been dispensed.

It has also been found that, where the prior art documents disclose that a magazine for the tablets or the like is exchangeable (U.S. Pat. No. 5,230,440), the tablets contained therein are not safely stored, since they are either freely movable therein and therefore subject to abrasion and/or become jammed during dispensing from the dispenser, resulting in problems in the dispensing of the tablets.

The problem addressed by the present invention is therefore that the known medicament dispensers do not permit sufficiently simple and safe handling, and the medicament portions contained in them are not accommodated with sufficient protection. The object is therefore to provide a medicament dispenser, and a cartridge for a medicament dispenser in which a cartridge of this kind for the medicament portions is located, which medicament dispenser and cartridge are simple and reliable in terms of their use and, in particular, ensure that the medicament portions are not damaged and are stored protectively during transport and storage and during use in the dispenser.

This problem is solved and this object achieved by the exchangeable cartridge according to patent claim 1, a medicament dispenser for solid medicament portions according to patent claim 14 that contains such an exchangeable cartridge, the use of the cartridge according to patent claim 15, and the use of the medicament dispenser according to patent claim 17 containing the exchangeable cartridge. Preferred embodiments of the invention are set forth in the dependent claims.

Where the terms “solid medicament portions” and “medicament portions” are used below in the description of the invention and in the patent claims, these terms are to be understood as meaning pills, coated pills, capsules, tablets and other solid presentation forms. To simplify the description of the invention, the term “tablets” is used below as being representative of other (solid) medicament portions. Therefore, the use of this term is intended in each case to signify any desired type of (solid) medicament portions.

Where terms are used below, in the description of the invention and in the patent claims, to designate in particular structural elements of the subject matter according to the invention, such as “receiving means” and the like, these terms, irrespective of whether they are used in the singular or plural, are to be understood in the singular and in the plural.

The cartridge according to the invention and the solid medicament dispenser are used jointly to dispense the tablets, with the cartridge, comprising a reservoir for the tablets, being inserted into the dispenser for use thereof. The cartridge and the dispenser preferably serve to administer medicaments and particularly preferably to administer hormone preparations and most preferably contraceptives or medicaments for hormone replacement therapy in the form of tablets. If the medicament contained in the cartridge is, for example, a hormone preparation, for instance for contraception, the latter can be taken in the usual manner, for example in a 24-hour cycle in a two-phase fixed administration scheme. This is followed by an administration-free period. For example, the administration-free period can be 7 days, or also 4 days, or another fixed number of days. Instead of the aforementioned fixed periods, for example of 21 administration days and 7 days free of administration, or 24 administration days and 4 days free of administration, or also instead of another fixed administration regimen, certain medicaments, for example for contraception, can also be taken in a flexible administration scheme, in which the administration phase lasts for at least 24 days and for at most 120 days, for example, and the administration-free phase lasts for 4 days, for example.

The cartridge according to the invention is insertable into the medicament dispenser and exchangeable. It is exchanged when empty. An empty cartridge is replaced by a full cartridge. The full cartridge is used to replenish the dispenser with tablets. For safe storage and transport of the cartridge, the latter can be accommodated in a preferably sealed container, for example in a closed pouch or in a blister pack which, for example, is made of aluminum foils and in which a receiving well for the cartridge is produced by cold-forming, as long as the cartridge is not yet to be inserted into the dispenser. In principle, however, the cartridge can also be connected fixedly to the dispenser, such that the dispenser is discarded when the cartridge is empty.

The cartridge is provided with a reservoir for receiving tablets, preferably in a column-shaped arrangement. The cartridge is therefore preferably cylindrical and preferably has a cylindrical reservoir.

In order to achieve the exchangeability of the cartridge according to the invention for tablets in the medicament dispenser, the dispenser has receiving means for the cartridge, for example a receiving shaft which extends in the axial direction in the dispenser and into which the cartridge can be pushed. For use of the medicament dispenser, the cartridge is inserted, for example pushed, into the receiving means, for example into the receiving shaft. Thus, the cartridge and the dispenser can be in a spatial and physical relationship to each other and together form the combination, according to the invention, of medicament dispenser and cartridge, which can be assembled to form one unit.

According to the invention, the cartridge comprises a transport safety mechanism which sits preferably with a frictional fit in the cartridge housing and which prevents movement of the tablets during storage and transport of the cartridge. Said transport safety mechanism may in particular be a tolerance compensation plug that sits preferably with a frictional fit in the reservoir and that is movable in the axial direction. This tolerance compensation plug is inserted into the reservoir before the cartridge is filled with the tablets, and it presses firmly on the stack of tablets after the cartridge has been filled with the tablets.

By virtue of the fact that the tolerance compensation plug sits with a frictional fit in the reservoir, it can keep the stack of tablets tightly packed even when the cartridge is not located in the dispenser, for example when the cartridge is being handled separately, for instance during storage or transport. It is necessary for the stack of tablets to be held firmly together in order to prevent the tablets from being able to move freely in the reservoir, so as to ensure that they do not tilt and become wedged and thus impede the dispensing of the tablets. Moreover, upon continued movement against one another, the tablets could also be subject to undesired abrasion. It should also be noted that the tablets have a thickness tolerance that leads to a height variation of the stack of tablets. For example, if the thickness tolerance of a 3 mm thick tablet is ±150 μm, the variation in the height of a stack of 30 tablets is approximately ±4.5 mm. By means of the tolerance compensation plug, the stack is always held securely in the reservoir independently of its actual height, i.e. even when the cartridge is no longer inserted in the dispenser. Compared to a compression spring, for example the resilient means from U.S. Pat. No. 5,230,400, that would press the tablets in the reservoir against one another and thereby fix them, the tolerance compensation plug has the advantage that, during transport and storage, the tablets are packed lying on one another without force and not, as in the case of the compression spring, under a spring tension that varies depending on the heights of the stacked tablets. Thus, the tablets are stored much more gently than in the case of the known magazines.

To permit the frictional fit of the tolerance compensation plug in the reservoir of the cartridge, the plug has at least one locking means for locking onto a profile extending preferably in the axial direction on the inside wall of the reservoir of the cartridge. This profile can be formed, for example, by a transverse groove profile made up of transverse grooves extending parallel to one another. For example, the transverse groove profile can form at least one axially extending ratchet track on the inside wall of the cartridge or can be provided on the entire inner circumference of the inside wall of the cartridge. By configuring the profile in the form of a ratchet profile, a form-fit engagement of the plug is achieved in one direction (toward the dispensing opening), and a friction-fit engagement in the other direction.

The at least one locking means on the tolerance compensation plug can in particular be formed by at least one outwardly acting spring element with locking lugs that locks onto the profile. For example, two spring elements with locking lugs can be provided on opposite sides of a base part of the plug, the spring elements preferably being outwardly resilient spring arms that protrude approximately axially and which have locking lugs engaging in the profile, for example in two opposite ratchet tracks. The tolerance compensation plug can be inserted first with the spring elements into the reservoir of the cartridge, such that the at least one locking means stands vertically and thus counteracts slipping out.

In a preferred embodiment of the present invention, the cartridge has a singulation device, preferably at one end. This singulation device is preferably designed such that the tablets are each dispensed individually or in another defined number, for example two tablets at the same time. For this purpose, the singulation device is designed such that it can be actuated via an operative connection between the singulation device and an actuating device or several actuating devices provided on the medicament dispenser. The actuating devices can comprise manual actuating means provided on the medicament dispenser, in order to dispense one tablet (or also several tablets at a time), and also mechanisms in the dispenser with which the movement generated by manual actuation of the actuating means is transferred from the actuating means to the singulation device. Since, in this embodiment of the invention, the singulation device for the tablets is provided on the cartridge, such a device is not provided on the medicament dispenser. By contrast, the actuating device or actuating devices for the singulation device are mounted on the medicament dispenser in this embodiment. These actuating devices are in a preferably mechanical operative connection to the singulation device. An electromechanical or purely electronic operative connection is also conceivable. To provide a mechanical operative connection, the singulation device on the cartridge can, for example, be provided with a pin, which can also be designated as a driver pin. In this case, by actuation of the actuating means on the dispenser, a movement is transferred for example to a claw provided with a recess and adapted to this carrier pin and from this claw to the carrier pin and hence to the singulation device. The movement generated by manual actuation of the actuating means on the dispenser is transferred to the claw preferably via the further interposed mechanical elements, for example transport levers, which represent the mechanisms for transferring the movement from the actuating means to the singulation device.

The provision of the singulation device on the cartridge has several advantageous functions:

The singulation device is used to allow the user to dispense the tablets contained in the cartridge either individually or in a defined number. Therefore, the user is able to safely remove the tablets from the cartridge, without more than one tablet accidentally being dispensed at a time.

Moreover, the singulation device closes the reservoir and therefore protects the tablets contained in the reservoir from external influences, such that the tablets contained therein cannot be damaged or otherwise impaired. In particular, the singulation device is used as a closure element, for example during transport and storage, but also during use by the user, such that the tablets are protected from external influences.

Provision of the singulation device on the cartridge further ensures that tablets cannot accidentally fall out, since the closure element cannot be accidentally detached. The singulation device can preferably only be actuated, and tablets thus released individually (or in a defined number), when the cartridge is inserted into the medicament dispenser. For actuation of the singulation device on the cartridge, manual actuating means are provided on the medicament dispenser, since for simple handling it is necessary to actuate the manual actuating means on the dispenser in order to dispense an individual tablet (or a defined number of tablets). It is in any case impossible, because of the singulation device, for more than one tablet (or more than a defined number of tablets) to be dispensed from the cartridge, and it is also extremely unlikely that the closure element of the cartridge on the singulation device will already be manually actuated when the cartridge is not located in the dispenser.

The assembly work when inserting the cartridge into the dispenser is also minimal. For example, it may suffice for the cartridge to be pushed axially into the receiving means for the cartridge in the dispenser, without a cover having to be removed or other assembly measures having to be taken. Therefore, it is not necessary, for example, to remove a lid, as in the case of the dispenser according to U.S. Pat. No. 5,230,440, in order to place the cartridge into the receiving shaft. This greatly facilitates the use of the dispenser with the cartridge. This advantage is achieved in particular by the fact that the singulation device is at the same time a closure element and is provided on the cartridge and not on the dispenser.

Moreover, during operation of the dispenser, the singulation device is actuated repeatedly and frequently in order to remove the tablets. Since the singulation device is provided on the cartridge and not on the medicament dispenser, wear and tear of the singulation device does not have the same disadvantage to the user as it would do if the singulation device were provided on the medicament dispenser, since the singulation device is exchanged with the cartridge when the latter no longer contains any tablets. If the singulation device were to be provided on the dispenser and not on the cartridge, it would have to be designed for a very much longer useful life, by suitable choice of materials and suitable construction. Moreover, abraded matter from the tablets, which can collect in particular in the singulation device, is discarded with the cartridge and does not collect in the dispenser during the entire lifetime of the latter. At any rate, this abraded matter, in combination with (air) moisture, is a good breeding ground for germs.

In another preferred embodiment of the invention, the singulation device has a slide that can be moved substantially perpendicularly to the axis of the cartridge. The slide serves as a structural element for singulation of the tablets. The slide can receive each individual tablet separately and move it separately in a sliding movement relative to the stack. The tablets in the cartridge are preferably arranged in a column-shaped stack located in the reservoir in the cartridge. The slide can then be arranged at one end of this stack and separate the tablets one after another from the stack.

For this purpose, the slide can preferably have a receiving compartment which is open at both ends in the axial direction and which receives a defined medicament portion, for example an individual tablet, or two tablets at the same time, or even more, i.e. more than two tablets at the same time. When receiving the tablet from the stack, this receiving compartment is closed on the side facing away from the stack. The receiving compartment is preferably dimensioned such that (only) one individual tablet (or also a defined number of tablets) finds space therein. To ensure that the singulation is effective and reproducible, the height of this compartment can be exactly the same as or slightly higher than the height of an individual tablet (or the height of a stack of a defined number of tablets). In this case, therefore, only a single tablet (or a defined number of tablets) is received in the receiving compartment and separated from the stack of tablets by the sliding movement.

The singulation device can further comprise a bottom shell. Moreover, the slide is movable, relative to the reservoir in the cartridge, between two slide positions, perpendicularly or substantially perpendicularly with respect to the axis of the cartridge. The bottom shell can be used, among other things, for closing the receiving compartment on the side lying away from the reservoir in the cartridge when the receiving compartment is flush with the reservoir in one of the slide positions (second slide position). In this case, a tablet passes into the receiving compartment and is held there by the bottom shell. The slide is then moved to the other of the two slide positions (first slide position) in which the tablet can be removed.

In a preferred embodiment, the bottom shell can in this case have a dispensing opening which is offset with respect to the cartridge axis and flush with the open receiving compartment when the slide is located in one of the two slide positions of the slide, preferably in the first slide position. The tablet then falls through the dispensing opening and can thus be removed. The tablet is thus removed from the side of the singulation device directed away from the reservoir. In an alternative embodiment for dispensing the tablet, the first slide position can also be chosen such that the tablet is dispensed on the same side of the singulation device as the reservoir. For this purpose, the slide would have to protrude laterally from the dispenser, and the first slide position of the receiving compartment would have to be located in the laterally protruding part of the slide. The tablets can also be dispensed laterally, i.e. in the plane in which the tablets are moved by the slide during the sliding process. In all of these cases, the tablets can each be stored and separated in a position in which they are arranged lying with their main surfaces on one another, or in a position in which they are arranged standing, i.e. lying with their side surfaces on one another.

The singulation device is preferably switched between the two slide positions. One of the two slide positions can be a rest position, and the other slide position can be a second position from which the singulation device returns automatically to the rest position, for example by being tensioned in this second position by a spring, which conveys it back to the rest position. It is possible that the second slide position, in which the receiving compartment in the slide is flush with the reservoir of the cartridge, is the rest position, or that the first slide position, in which the receiving compartment in the slide is flush with the dispensing opening in the bottom shell, is the rest position.

The bottom shell of the cartridge can in particular be fitted flush with the outer skin of the dispenser. This prevents the user from removing the cartridge from the dispenser by manipulation, for example before the cartridge is completely empty. Moreover, the cartridge is fitted in the dispenser in such a way that the tablets, and thus the medical active substances in the tablets, do not come into contact with the dispenser or parts thereof when being singulated and dispensed or released from the dispenser. This embodiment is particularly advantageous for medico-legal reasons.

In a preferred embodiment of the invention, the cartridge and the medicament dispenser are designed such that the cartridge can be pushed into the dispenser only in one (axial) rotation orientation, such that one of the two cartridge halves that delimit the reservoir comprising the tablets is oriented to the front and the other one is oriented to the rear. This allows the two cartridge halves to be used in different ways. For example, one half can be printed, for example with information concerning the tablets contained in the cartridge, and the other half can be transparent, such that the tablets can also be seen from the outside.

In another advantageous embodiment of the invention, the cartridge is designed such that the tablets can be dispensed in the axial direction. This is to be understood as meaning that the tablets are not dispensed laterally from the dispenser but instead at an end face of the dispenser, specifically in a direction extending in the axial direction, i.e. along the axis of the cartridge or parallel to this axis. For this purpose, it is also advantageous if the medicament dispenser too is designed such that the tablets are dispensed in the axial direction.

Therefore, a user can easily remove the tablets to be dispensed by holding the dispenser in one hand and using the same hand to actuate the actuating means provided on the dispenser for dispensing of the tablets, such that the tablet falls into the other hand. For this purpose, it is sufficient if the user holds the dispenser such that the side where the cartridge has been inserted into the dispenser is held over the other hand and then actuates the dispenser in order to dispense the tablet. More defined orientation of the dispenser relative to the hand not holding the dispenser is not required, such that the tablet falls safely into the user's hand, and the user can thus safely take hold of the tablet. Incorrect use, in which the tablet accidentally falls out and does not end up in the user's hand, is therefore ruled out in practice. Therefore, the handling of the dispenser is safer and more reliable than that of the known dispensers.

In another preferred embodiment of the invention, the cartridge contains a tablet rider which is movable in the axial direction in the reservoir and which engages through at least one axial slit in the cartridge and which serves to entrain the thrust means located in the medicament dispenser, for example a thrust bracket which is likewise movable preferably in the axial direction, and to transfer an elastic force, which preferably acts from the outside and which is preferably directed axially, to the tablets which are contained in the cartridge in the preferably column-shaped arrangement, and therefore to hold down the preferably column-shaped arrangement of tablets by way of the thrust means.

In another embodiment of the invention, in order to generate the elastic force, at least one elastic means can be provided which, upon insertion of the cartridge into the medicament dispenser, exerts an elastic force on the cartridge in the axial direction counter to a direction in which the cartridge (900) is pushed into the medicament dispenser (1) (direction of insertion). This has the result that the cartridge in the dispenser is under tension, preferably spring tension. The spring force acting on the cartridge has the effect that the tablets in the cartridge are pressed against one another, such that they do not fall back and forth in the reservoir of the cartridge during the movement of the dispenser. Since the tablets are always under spring tension, the order initially set up in the stack of tablets is not lost.

The spring force is preferably exerted by elastic means configured in the form of at least one constant-force spring, in particular two constant-force springs. In this way, the stack of tablets located in the reservoir of the cartridge can always be subjected to the same force independently of the actual height, i.e. of the filling level of the cartridge, such that the tablets are treated carefully, without having to lose the advantage of applying tension to the stack of tablets, even when the latter is only very small, for example comprising two or three tablets. The at least one elastic means can be formed, for example, by a spring steel band.

The abovementioned thrust means, for example the abovementioned thrust bracket, which is movable preferably along the receiving shaft, can also be used in particular to transfer an elastic force to the tablets contained in a column-shaped arrangement in the cartridge. This thrust means can, on the one hand, have the function of transferring the outer elastic force to the stack of tablets. This is done, for example, by securing a spring or two springs on the thrust means and on a counter-bearing in the medicament dispenser. It is preferable to provide two constant-force springs, of which one is secured on one end of the thrust means, for example on one end of the thrust bracket, and the other is secured on the other end of the thrust means, for example on the other end of the thrust bracket, such that a symmetrical force is transferred to the thrust means. Alternatively, it is also possible to provide a single spring, which engages on the thrust means. In this case, asymmetrical forces that are generated are intended to be compensated. As has already been explained above, the thrust means can also be used among other things to cancel the locking action for ejecting the cartridge, i.e. the thrust means can at least be part of the means for cancelling a locking action.

By way of the thrust means, for example the thrust bracket, a force is applied to the stack of tablets in the reservoir, which force originates, for example, from springs engaging on tile thrust means, for example constant-force springs, such that the stack of tablets is at all times under the effect of a force in the axial direction when the cartridge is located in the medicament dispenser. This has the result that the tablets cannot move freely in the reservoir. By means of this force, the stack of tablets is pressed against the receiving compartment in the singulation device, such that a tablet always passes into the receiving compartment when the slide is located in the first slide position. To achieve this, the thrust means, for example the thrust bracket, sliding along the outside of the cartridge can come into form-fit contact with the tablet rider. For this purpose, the tablet rider, which is freely movable in the axial direction in the reservoir of the cartridge, can engage through at least one axial slit on the cartridge, for example with an arm or also with two arms (in this case through in each case one axial slit), such that the thrust means can exert the force on the tablet rider, and thus on the stack of tablets, via this arm or another projection. In this way, when the cartridge is located in the medicament dispenser, an axial force is applied to the stack of tablets, which axial force acts in the direction of the singulation device. In this way, the stack is always pressed down, such that a tablet can pass into the receiving compartment when said receiving compartment in the singulation device is flush with the reservoir.

Instead of a tablet rider, which has an arm engaging through a slit in the cartridge housing, or several arms engaging through several slits, with a force being applied to the stack of tablets from outside via the tablet rider, it is also possible to choose another embodiment in which no slit is provided in the cartridge housing. In the latter case, the force must be applied to the stack of tablets from outside in some other way, for example via an axial transfer means which, at only one end of the cartridge housing or at both ends of the cartridge housing, is subjected to an external force, which then leads to an axial force being applied to the stack of tablets. An embodiment of this kind can be obtained, for example, by a band being inserted into the cartridge housing, preferably at the lower end thereof, and being guided round the stack of tablets. When this band is pulled, a downwardly acting axial force is then applied to the stack of tablets. For example, the band stretching round the stack of tablets can be guided out laterally from the cartridge housing at the base of the stack of tablets on both sides. Or the band is guided out only at one side and is secured on the other side to the base of the cartridge housing. Alternatively, an axially movable rod can also be used which sits on the stack of tablets and applies an axial force to the stack.

Quite generally, when a full cartridge is pushed into the dispenser in the insertion direction, the thrust means, for example the thrust bracket, can be entrained in this movement, for example by the thrust means being entrained upward via the tablet rider. This thrust means can also lock the cartridge in the dispenser via at least one suitable locking means, for example by the entrained thrust means running onto a run-on surface of a locking lever arranged in the upper area of the dispenser for the purpose of locking the cartridge in the dispenser. Upon successive unloading of the cartridge, this thrust means can then be moved successively downward, such that the filling level in the cartridge is coded by the position thereof in the dispenser. When this thrust means finally comes to a (lower) end position, which is predefined by the empty cartridge, the locking of the cartridge can be undone, such that the cartridge can be removed from the dispenser. This can be done, for example, by the thrust means, in the lowermost position, bringing the locking levers to an unlocked position and, if appropriate, additionally unlocking suitable ejection means for the cartridge.

To ensure that the cartridge remains fixed in the dispenser after insertion into the receiving shaft or, quite generally, after insertion of the cartridge into the receiving means, at least one locking means is provided for locking the cartridge in the medicament dispenser. This locking action with the locking means is preferably such that the cartridge is locked after being pushed into the dispenser, i.e. cannot be removed again without the locking action being cancelled, as long as there are still tablets in the cartridge. Only after the cartridge is empty can the locking action in this case be cancelled in order to be able to remove the cartridge from the dispenser, such that a new cartridge filled with tablets can be inserted.

For the locking action, a locking means of this kind can be formed, for example, by one or more locking lugs on the cartridge and one or more locking profiles, for example eyelets, on the dispenser, which engage with the locking lugs, or conversely by one or more locking lugs on the dispenser and one or more locking profiles, for example eyelets, on the cartridge. In principle, of course, other locking means are also possible, for example locking lugs that engage behind projections, or two intermeshing locking profiles or the like. For example, the at least one locking means can be movable in rotation. It can preferably be formed by rotatably movable locking levers, which in particular can have two arms and can be equipped with locking lugs. In particular, the locking lugs can each be provided at the lower part of the locking lever. The locking means are located in the dispenser.

Each locking lug preferably locks on the locking levers with a locking eyelet or the like provided on the cartridge. Instead of a locking eyelet, it is also possible, for example, to provide a projection on which the locking lug abuts, or a recess into which the locking lug engages. To additionally secure the locking action, a pressure point can also be provided on the locking levers, at a position other than the one where a locking lug or a projection is provided, which locks behind a corresponding locking lug or a projection, for example in the dispenser housing.

In a particularly expedient embodiment, the locking levers with the locking lugs can protrude into an area which adjoins the area in which the cartridge is received in the dispenser, for example in the front area of the dispenser adjoining the receiving means for the cartridge in the dispenser, for example the receiving shaft. On the cartridge, in the adjoining area, receiving eyelets then have to be provided into which the locking lugs of the locking levers engage. This adjoining area can be located, for example, on the bottom shell of the cartridge.

In addition, an ejection block can also be provided which, for example, can comprise a release lever. External, manually actuated ejection means for ejecting the cartridge, for example an ejection button, are blocked by the ejection block, such that removal of the cartridge is possible only when the cartridge no longer contains any tablets. This block blocks the actuation of these external ejection means and only frees them again when the cartridge is empty. This block can in particular be released by the abovementioned means for cancelling the locking action. For this purpose, an ejection slide can be provided that can be actuated by the ejection means, with the cartridge still containing at least one medicament portion.

If the aforementioned at least one locking means leads to a locking of the cartridge in the dispenser, i.e. the at least one locking means can no longer be released without separate cancellation of this locking action, at least one means must also be provided for cancelling the locking action. This means for cancelling the locking action is preferably designed such that the locking action can be cancelled only when there are no more medicament portions left in the cartridge. Without a locking action, the catch could be released simply by manually overcoming the locking force of the at least one locking means. This would be possible if the at least one locking means, by suitable design of the parts forming the locking connection, is designed such that these slide along one another, when a force is applied releasing the locking means, such that the locking action is cancelled.

However, if a locking action takes place upon engagement of the at least one locking means, for example because the locking lugs and locking profiles are so designed that the locking action cannot be cancelled without destroying the at least one locking means, unless the locking action is released at the same time, the at least one means for cancelling the locking action must be released manually or preferably by a mechanism present in the dispenser, or also by a combination of these means. For this purpose, the dispenser can accommodate at least one unlocking means which, depending on the filling state of the cartridge with tablets, releases the locking lugs of the locking levers, preferably only when the cartridge is empty. In this case, the at least one locked locking means is released by the at least one unlocking means, by the at least one locking means being brought from a locking position to the unlocked position without external manual actuation. This unlocking means can in particular be the above-described thrust means, which brings the locking of the cartridge to the locked position upon insertion and to the unlocked position after emptying of the cartridge. The locking means are locked by the thrust means pressing against one or more upper parts of the locking lever. Moreover, the thrust means can also act on the ejection block and release the latter, preferably when there are no more tablets left in the cartridge. For this purpose, the thrust means for releasing the blockade of the ejection means can actuate the release lever, such that the ejection slide and with it the ejection means are unlocked. The ejection slide preferably presses, by actuation of the ejection means, against one or more lower parts of the locking means, preferably of the locking lever, and in this way unlocks the cartridge locked with the locking means.

The unlocking can be effected, for example, by suitable means in the medicament dispenser, the position of which means is dependent on the filling level of the cartridge. For this purpose, for example, the thrust bracket, mounted axially movably on the cartridge, or another movable thrust means can be provided which, for example, is in each case located at the height of the tablet located at the uppermost position in the cartridge. It is only when there are no longer any tablets in the cartridge that the thrust bracket, or the other thrust means, is also located at the lower pole position and in this case releases the locking action.

To be able to unlock the external, manual ejection means for ejecting the cartridge, i.e. to be able to release the blockade of the ejection block, the same means for cancelling the locking action can be provided again, for example the aforementioned thrust bracket or the other thrust means, whose position is dependent on the filling level of the cartridge.

In another preferred embodiment of the invention, an actuating means for dispensing medicament portions is provided on at least one narrow side of the medicament dispenser. Moreover, a further actuating means can be provided on another narrow side of the medicament dispenser, preferably on the second narrow side directed away from the first narrow side. These actuating means each serve to dispense a tablet from the cartridge by manual actuation. For this purpose, the actuating means can be operatively connected to the singulation device via suitable transfer means in a mechanical, electromechanical or electronic operative connection, in order in each case to release one tablet from the cartridge. As the actuating means are provided on the narrow sides of the medicament dispenser, they can be easily actuated even when the user operates the dispenser with just one hand, for example by the user holding the dispenser in one hand and applying pressure to the narrow sides of the dispenser and thus actuating the actuating means. Instead of the actuating means being positioned on one or both narrow sides of the dispenser, the actuating means can also be arranged at another location on the dispenser, for example on the front or rear of the dispenser, or one or both end faces.

In a preferred embodiment of the invention, the transfer means by which the actuating means are operatively connected mechanically to the singulation device are formed by mechanisms by which a movement generated by actuation of the actuating means is transferred to a singulation device provided on the cartridge. For this purpose, for example, transport levers can be used which, if appropriate, can be synchronized, for example via in each case a toothed rod and a toothed wheel meshing with the latter. The transport levers can, for example, be in a direct mechanical operative connection to the singulation device, for example a form-fit connection, for example by provision of a carrier pin on the singulation device and of a recess, operatively connected to the carrier pin, on at least one of the transport levers, or vice versa.

Moreover, in a preferred embodiment of the invention, a window can be provided in an outer face of the housing of the medicament dispenser, such that the tablets located in the cartridge are visible from the outside. This permits a visual check of the filling level of the cartridge. Moreover, the tablet rider can be colored in order to contrast it against the tablets and, for example, also against the background of the cartridge and/or the components of the dispenser otherwise visible through the window. This makes visual monitoring of the filling level of the cartridge through the window easier. For this purpose, the cartridge can preferably be made at least partially of a transparent material. I n principle, however, it can also be made at least partially of a translucent material. In particular, the part of the cartridge that is visible through the window in the housing of the dispenser can be made of a transparent or translucent material, such that the tablets contained in the cartridge are visible.

In addition, the medicament dispenser can have an electronic display for showing the number of tablets taken and/or the number of tablets still to be taken and/or the number of tablets still located in the cartridge. Each of these information items can be displayed alternately, for example by manual selection. The electronic display can additionally be designed such that alarm signals are displayed, for example to show that a time period during which a tablet is to be taken has been exceeded or has not been met, and to show the charge status of a battery used in the dispenser. The display can also be used to view the status of different administration phases, for example a display showing that the user is in a first, second, third or n-th phase, where the first phase, for example, can constantly cover 24 days, the second phase being flexible, for example from 0 to 96 days, and the third phase again constantly covering 4 days for example.

To be able to display said information on the electronic display, an electronic circuit is provided, preferably in the form of a circuit board with an integrated semiconductor circuit accommodated thereon. Switches can also be mounted on and connected to the circuit board, preferably electrical operating buttons, in order to perform the required inputs, for example for selecting the display mode (number of tablets taken, number of tablets still located in the cartridge). Moreover, electrical switches can be provided in the dispenser in order to be able to automatically determine certain operating states of the dispenser with the cartridge, for example the first use of the dispenser by first insertion or pushing-in of the cartridge into the dispenser, as a result of which, for example, batteries serving to supply power to the electrical circuit and to the electronic display are activated, i.e. are connected to the circuit and to the display, and also the dispensing of a tablet, the ejection of the cartridge and/or the detection of a defined small number of tablets remaining in the cartridge, in order to correctly display how many tablets are still located in the cartridge. For the last-mentioned function, it is normally sufficient, starting from the number of the tablets in a completely full cartridge, to calculate how many tablets are still located therein, if each dispensing of a tablet is detected. However, this display may be subject to error if the number of the tablets fluctuates because of an unavoidable thickness tolerance of the tablets in the completely full cartridge. This error can be ruled out by detecting that, for example, there are still four tablets located in the cartridge.

The invention is explained in more detail below on the basis of illustrative embodiments, which are depicted schematically in the figures. However, the invention is not limited to the examples and instead only presents preferred embodiments. Other embodiments with variants of the individual features of the invention are equally conceivable and fall within the scope of protection of the invention. Identical reference signs in the individual figures designate identical elements or designate elements that are identical in function or that correspond in terms of their function. Here:

Figure 1A:
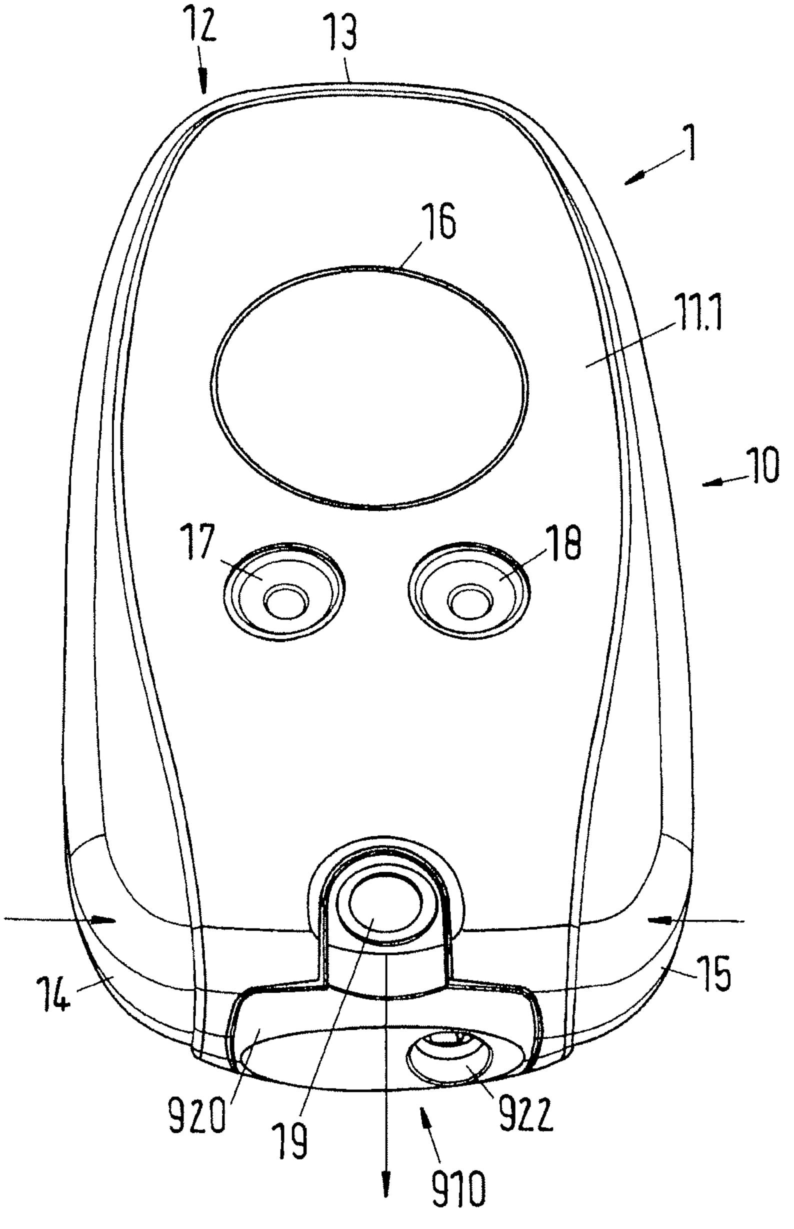
FIG. 1A shows a perspective front view of the dispenser according to the invention with inserted cartridge.
Figure 1B:
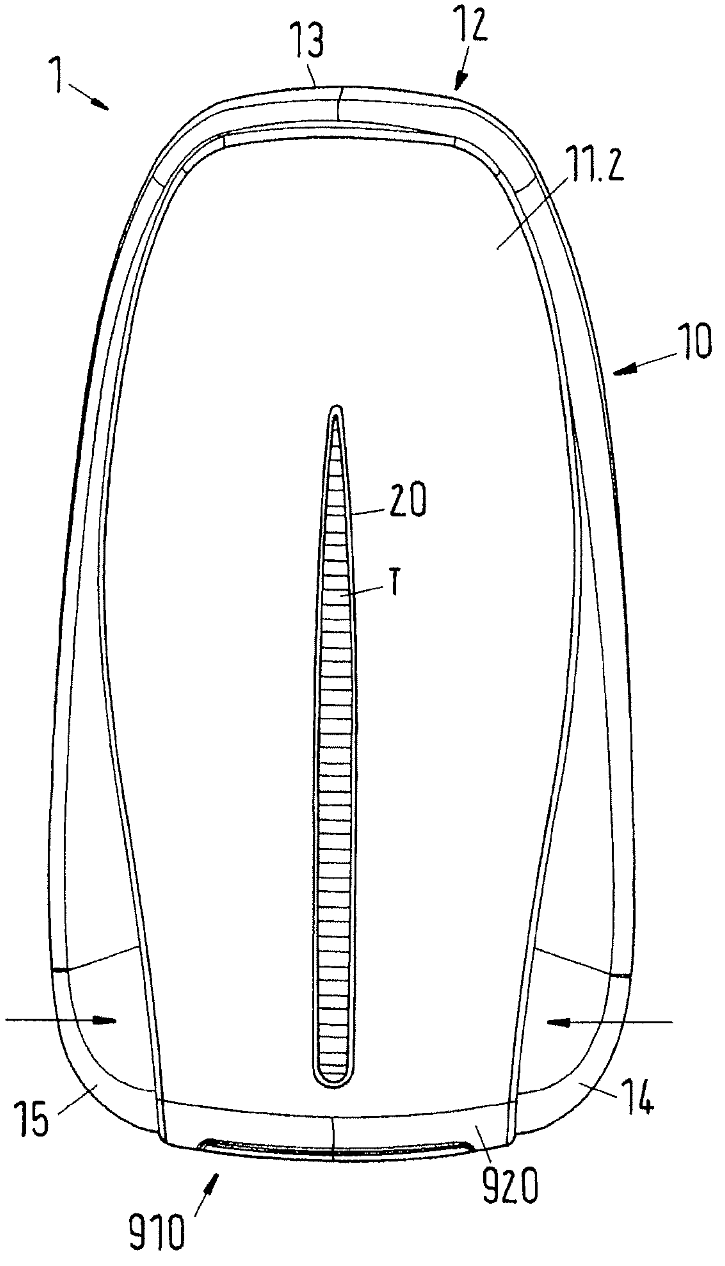
FIG. 1B shows the same as FIG. 1A in a rear view.

The dispenser 1 shown in FIGS. 1A, 1B is used to dispense tablets T, which are taken for contraception, for example. The dispenser is suitable in particular for dispensing contraceptives that are taken on a daily basis in what is called a flexible regimen, i.e. in a first administration phase, which lasts for 24 days, thereafter in a second administration phase, which lasts for 0 to 96 days, such that the first and second administration phases can together last for up to 120 days. In this case the user decides, after expiry of the first administration phase, when the administration is to be discontinued and an administration-free phase begun. An administration-free phase of 4 days following on from the second administration phase is followed again by the first administration phase.

Of course, the dispenser can also be used to dispense other tablets T, for example medicaments for hormone replacement therapy, diuretics or antihypertensive agents.

The dispenser 1 comprises a dispenser housing 10 with a housing front shell 11.1 (FIG. 1 A) and a housing rear shell 11.2 (FIG. 1 B), and a housing part 12 which connects the two housing shells, encloses the dispenser on three narrow sides, is composed of several parts and, in the lower area, is designed on each side as an actuating button 14, 15. The housing part is made of a composite material in order to ensure that the part located at one end face in the area 13 is rigid, while the two actuating buttons located laterally on the narrow faces of the dispenser are movable, so as to be able to perform a button movement (see arrows) directed toward the dispenser body. Alternatively, the housing part can also be designed as a deformable hard shell that can be pressed inward in the lower area, such that the actuating buttons are formed.

An electronic display 16 and operating buttons 17, 18 are provided in the housing front shell 11.1. The electronic display is used for checking the administration of the tablets T. The operating buttons 14, 15 are used to select a menu item shown on the display, for example for checking the battery, the administration day, the administration-free day, and the number of tablets still located in the cartridge, and for choosing whether administration of the tablets should be discontinued.

FIG. 1B shows the rear face of the dispenser 1. The rear face contains a window 20 that extends in the axial direction and reveals the tablets T contained in the cartridge. For this purpose, the housing rear shell 11.2 of the cartridge in the area of the window and the cartridge housing must be made transparent at least in the part visible through the window.

In the lower area of the dispenser 1, part of the cartridge can be seen, namely the cartridge bottom shell 920, which lies flush on the housing of the dispenser. A dispensing opening 922 for the tablets T can be seen in the cartridge bottom shell (FIG. 1A). The cartridge ejection button 19 is let into the housing front shell 11.1 and is pushed in the direction of the arrow in order to eject the cartridge from the dispenser when empty.

Figure 2:
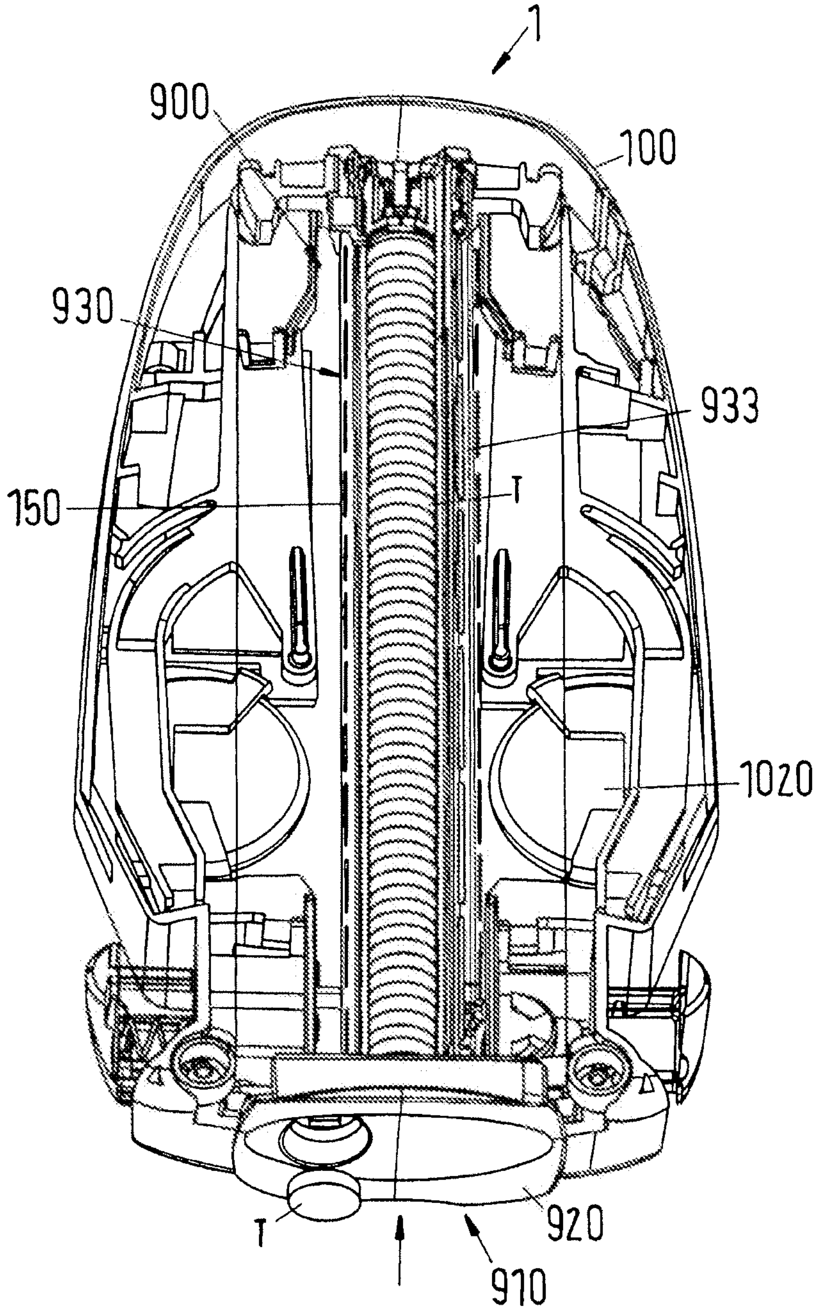
FIG. 2 shows a perspective view of the interior of the dispenser with an inserted cartridge, the dispenser being shown here from the rear.

FIG. 2 shows a part of the dispenser 1 (without outer skin) and a cartridge 900 pushed into the dispenser, seen from the rear. The cartridge is pushed into the dispenser from below (see arrow), and the cartridge has a singulation device 910 of which part is the cartridge bottom shell 920 and via which the cartridge bears on the dispenser housing in the lower area of the dispenser (FIG. 1A). The cartridge additionally comprises a cartridge housing 930 in which the tablets T are located. This housing is formed by a cartridge front shell 933 and by a cartridge rear shell (not shown) which, for use in the dispenser, is preferably made of a transparent material, such that the tablets can be seen through the window 20 on the rear face of the dispenser (FIG. 1B).

In its inside, the dispenser 1 contains a housing interior framework 100, which assumes substantially all the static functions of the dispenser. The housing interior framework has, for example, a central web 110 (concealed) curved cylindrically inward from one side in order to receive the cartridge housing 930 (the front half of the cartridge housing can be seen only in part). The inward curve of this web, together with further structural elements (not shown here) of the dispenser, forms a receiving shaft (indicated by reference sign 150) into which the cartridge can be pushed from below into the dispenser. The receiving shaft is only indicated here by broken lines and is characterized by an elongate hollow space.

Figure 3:
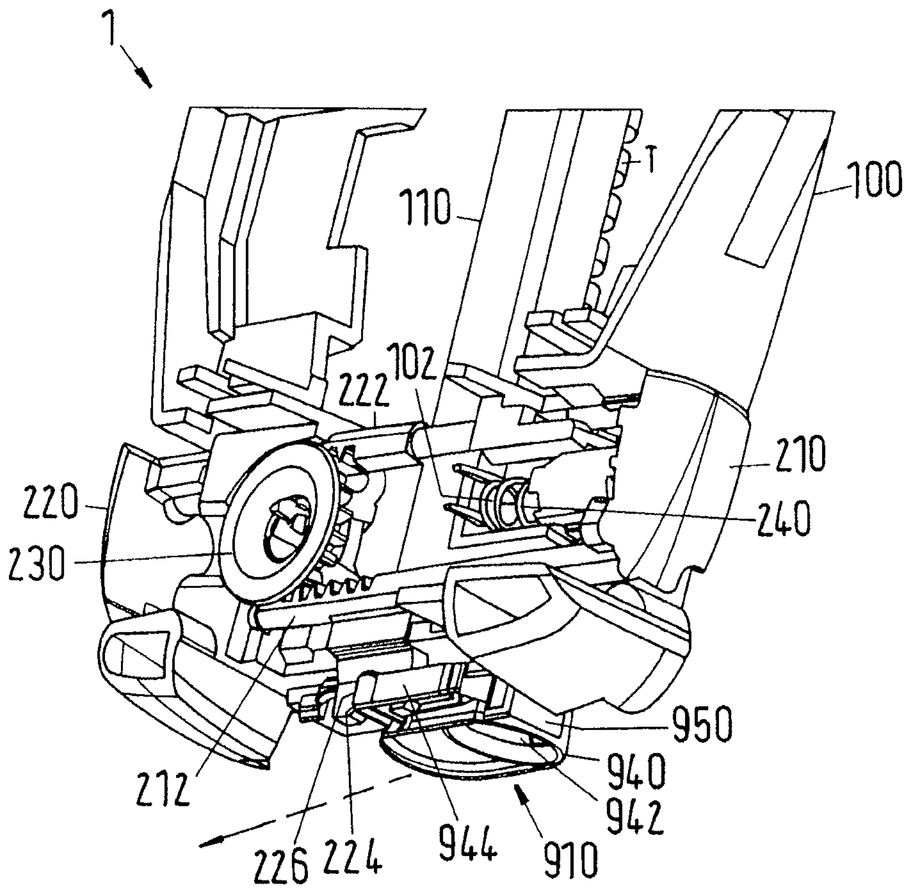
FIG. 3 shows a perspective detail of the lower part of the housing interior framework, with the parts of the singulation device that are necessary for dispensing tablets, the housing interior framework being shown here from the front of the dispenser.

FIG. 3 shows the lower part of the housing interior framework 100 of the dispenser 1 freed of the outer skin, seen from the front. The singulation device 910 of the cartridge is shown at the bottom narrow side of the dispenser, but in this case without the bottom shell 920. For this reason, a tablet slide 940 belonging to the singulation device can be seen here, which tablet slide 940 slides in a slide holder 950 and is received by the latter and has a throughopening 942 that also serves as a receiving compartment for tablets T that are to be dispensed. In a first position, this receiving compartment is flush with the dispensing opening of the bottom shell, such that a tablet located in the receiving compartment can be dispensed outward. When the tablet slide has been moved to a second position (toward the left as shown by the arrow), the receiving compartment is flush with the reservoir for the tablets that is formed by the cartridge housing 930 (not shown), such that a tablet can fall into the receiving compartment in this position. The receiving compartment is closed off at the bottom by the cartridge bottom shell 920 (not shown) in this position. To effect this movement, the following structural elements are provided:

The actuating buttons 14, 15 on the dispenser housing 10 are pressed inward to actuate the dispenser 1 (FIG. 1A; see arrows). In doing this, they act on two transport levers, namely a right-hand transport lever 210 and a left-hand transport lever 220. These two transport levers have toothed rods 212 and 222, respectively, and are operatively connected to a toothed wheel 230 via these toothed rods. The toothed wheel is mounted on the housing interior framework 100. The right-hand transport lever is supported on an abutment 102 via a compression spring 240, such that this transport lever and therefore also the left-hand transport lever return to the starting position (first position), i.e. to a position in which both levers are driven outwards, after actuation of the actuating buttons. A jib arm 224, which has a recess 226, is also formed integrally on the transport lever. A carrier lug 944 is formed integrally on the tablet slide 940 and engages in this recess. As the transport levers 210, 220 are forced outward by the spring force of the compression spring 240, the levers are located on the outside in the unloaded (first) position, such that the tablet slide is located in the right-hand position (shown in FIG. 3). In this position, the receiving compartment 942 in the tablet slide is flush with the dispensing opening 922 in the cartridge bottom shell 920. By actuation of the actuating buttons 14, 15, the transport levers are forced inward and thus push the tablet slide to the left (second position). In this way, the receiving compartment is moved to a position flush with the reservoir of the cartridge, such that a tablet falls out of the reservoir into the receiving compartment. When the actuating buttons are let go, the transport levers and thus also the receiving compartment located in the slide are conveyed back to the right by spring force, such that the receiving compartment again reaches the position in which it is flush with the dispensing opening. In this way, a tablet is dispensed from the dispenser.

Figure 4:
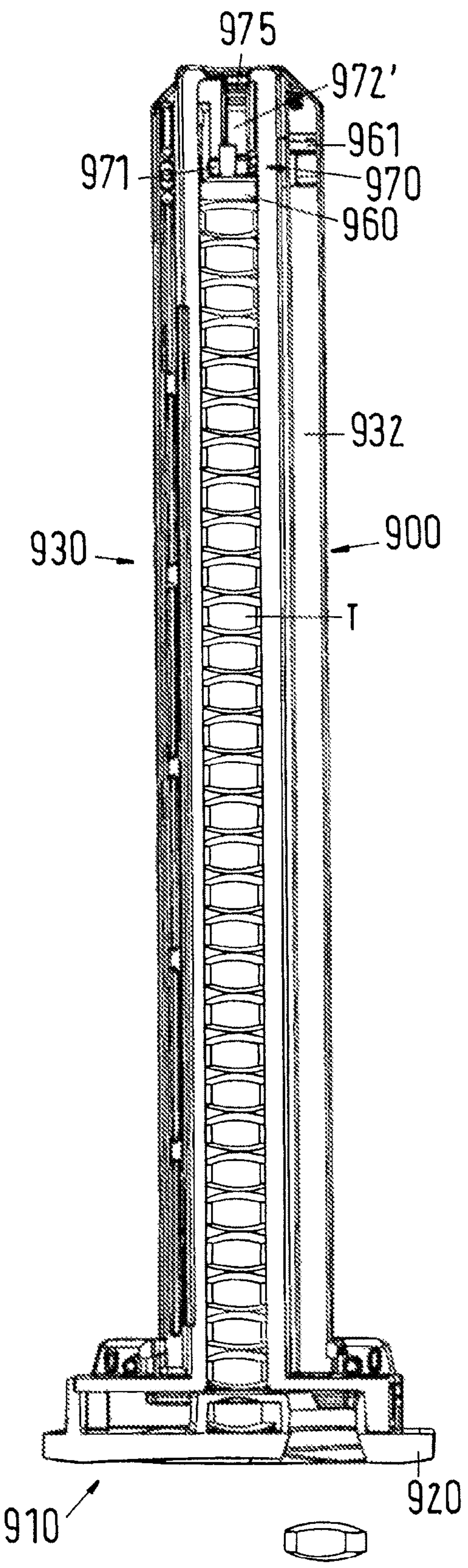
FIG. 4 shows a sectional view of the cartridge filled with tablets and with the singulation device, seen from the front.

FIG. 4 shows a sectional view of a cartridge 900 filled with tablets T, seen from the front. The cartridge has a singulation device 910 with the cartridge bottom shell 920 recognizable here, and a cartridge housing 930 composed of the cartridge front shell (not shown here) and the cartridge rear shell 932. By means of the cartridge front shell and the cartridge rear shell, a cylindrical reservoir is formed in which the tablets are stacked. Between the two cartridge shells, an axially extending slit is located on one side (the right-hand side).

In the form shown here, the cartridge 900 can be handled separately, i.e. can be used to replenish the dispenser 1, by means of the cartridge being pushed from the end face into the substantially cylindrical receiving shaft 150 in the dispenser and being locked therein. For transport and storage of the separate cartridge, the latter is preferably sealed in a watertight and airtight secondary package, for example in a pouch or a blister pack.

Figure 4A:
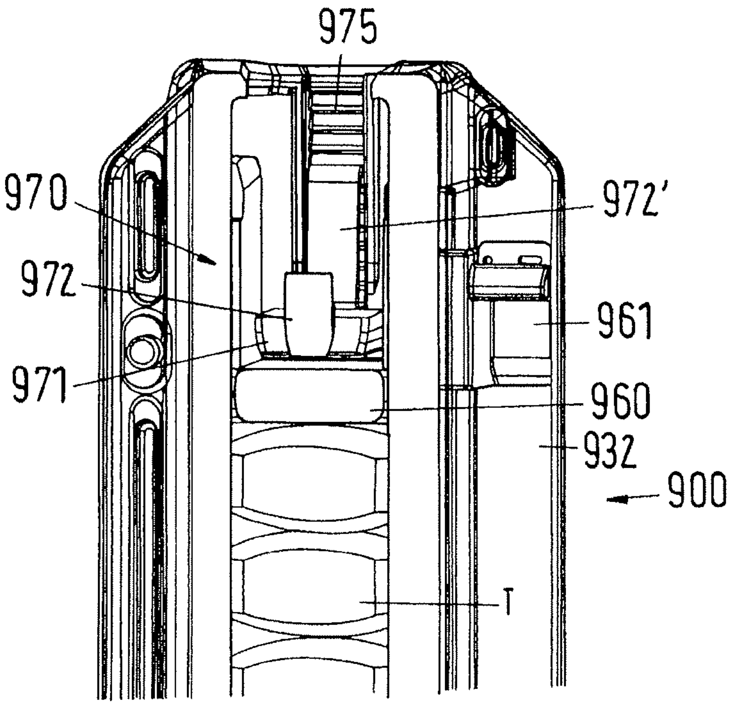
FIG. 4A shows a sectional view of the head of the cartridge, seen from the front.

Situated in the cartridge housing 930, above the stack of tablets T, there is a tablet rider 960 that can in principle move freely in the axial direction in the reservoir of the cartridge (FIG. 4A). For this purpose, a rider arm 961 of the tablet rider engages through the axially extending slit between the cartridge front shell 933 (not shown) and the cartridge rear shell 932. The tablet rider rests on the stack of tablets. However, the axial movement of the tablet rider is limited toward the top by a tolerance compensation plug 970. This plug is fitted into the reservoir before the cartridge 900 is filled with the tablets T and, after the cartridge has been filled, is pressed onto the stack of tablets and the tablet rider. Since the tolerance compensation plug slides with frictional engagement in the reservoir, it is pressed onto the stack of tablets, during handling of the cartridge outside the dispenser, and holds the stack together, such that the individual tablets cannot slip out of place or against one another. On the one hand, this avoids abrasion of the tablets and, on the other hand, avoids the tablets being set edgeways or at an angle during the free movement. This prevents tilting and therefore jamming of the tablets in the reservoir. To achieve the frictional sliding of the tolerance compensation plug 970, the latter has a main body 971 and two spring elements with locking lugs 972, 972', which bear on the inside wall of the cartridge housing. To effect the frictional engagement, the inside wall, in the areas where the locking lugs are in contact with the inside wall, has mutually opposite ratchet tracks 975 in which the locking lugs engage (see detail in FIG. 4A). These ratchet tracks are formed only along a length of ca. 2 cm, since the tolerance compensation plug is intended to keep the tablets so tightly packed during handling only when the cartridge is completely full, such that the plug must be frictionally connected to the inside wall of the cartridge housing only in that area where it is necessary to compensate for the fluctuation in stack height resulting from the thickness tolerance of the individual tablets.

Figure 5:
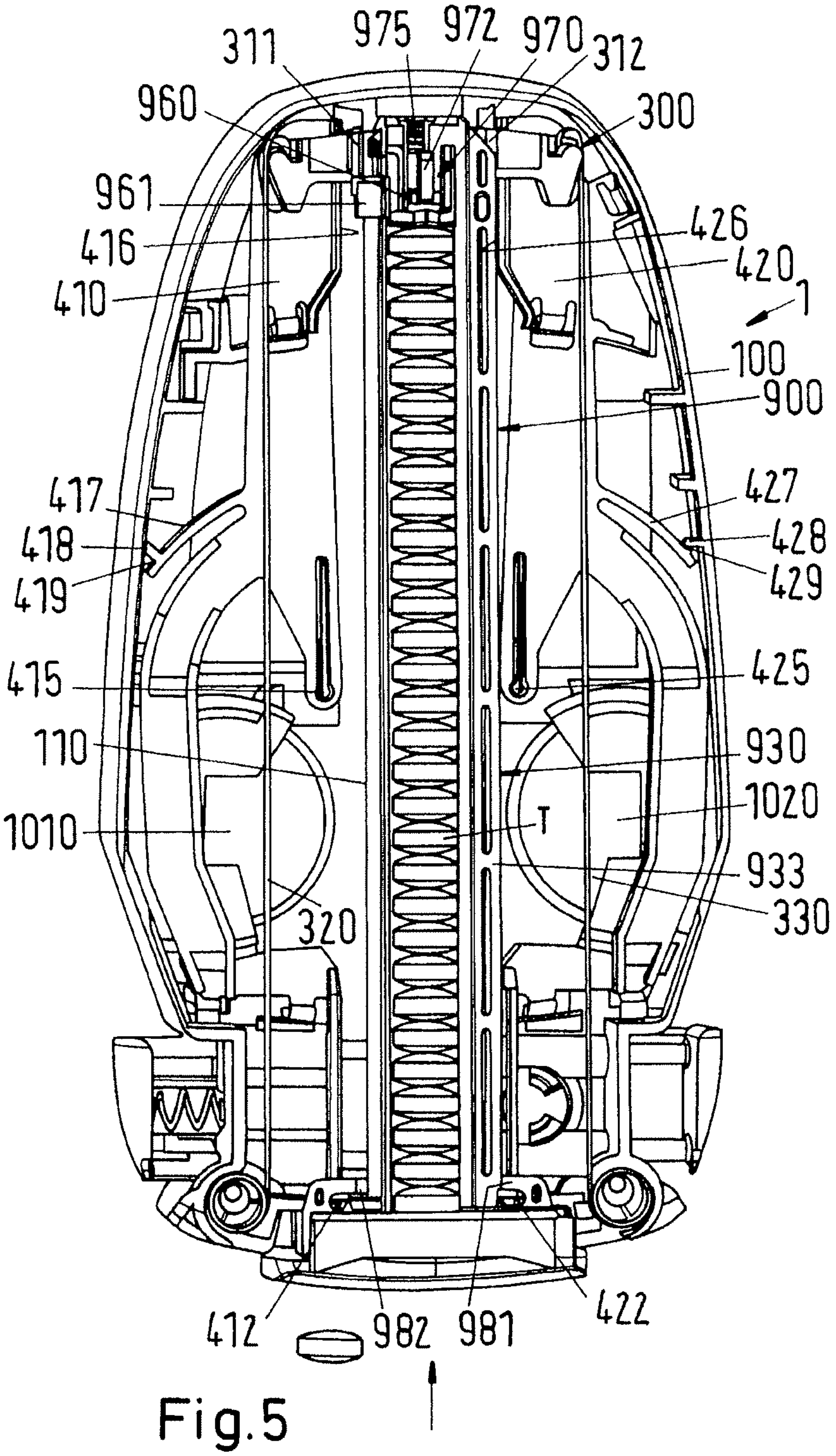
FIG. 5 shows a perspective view of the dispenser without outer skin, with an inserted cartridge (open) filled with tablets, seen from the rear.

FIG. 5 shows the dispenser 1 without outer skin and seen from the rear, said dispenser 1 containing a cartridge 900 filled with tablets T. The cartridge contains the tablet rider 960, which sits on the stack of tablets and which has a rider arm 961 protruding from the cartridge housing 930. The tolerance compensation plug 970, which encloses the spring elements with locking lugs 972 (one of the spring elements is shown here), sits on the tablet rider. The locking lugs of the spring elements engage in the ratchet tracks 975.

Figure 6:
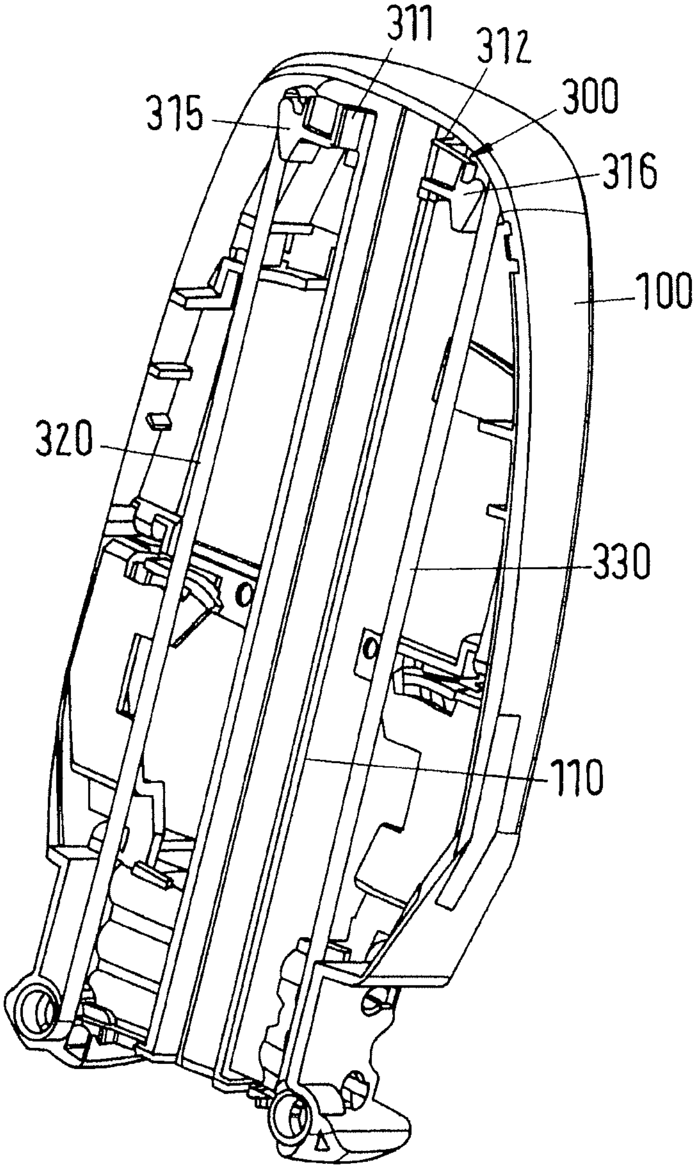
FIG. 6 shows a perspective view of the housing interior framework of the dispenser, with the thrust bracket and the constant-force springs, seen from the rear of the dispenser.

The dispenser 1 additionally comprises a thrust bracket 300 which engages around the central web 110 of the housing interior framework 100 and is movable along this web in the axial direction and guided thereon, for example by a dovetail guide, formed by the side faces of the web and the U-legs 311, 312 of the bracket, or by locking of these U-legs onto the side faces of the web (FIG. 6).

In FIG. 6, the housing interior framework 100 with the thrust bracket 300 is shown from the rear of the dispenser 1. The thrust bracket has two jibs 315, 316 which are formed on the U-legs 311, 312, approximately at right angles thereto. At the ends of these jibs there are fastenings for one end of the constant-force springs 320, 330. At their respective other ends, the constant-force springs are fastened in the lower part of the housing interior framework 100 and wound up there. In this way, an upward movement of the thrust bracket in the axial direction can be achieved only counter to the spring force of the constant-force springs. Alternatively, however, the constant-force springs can also be held wound in suitable holders on the thrust bracket, for example on the jibs thereof, and their other ends fastened at the bottom on the housing interior framework.

When the cartridge is pushed from below into the receiving shaft 150 (not shown here) in the dispenser 1 (arrow), the rider arm 961 (FIG. 5) engaging through the axial slit between the cartridge rear shell (not shown) and the cartridge front shell 933 of the cartridge engages on the underside of the U-leg 311 of the thrust bracket 300 and pushes the thrust bracket upward as the cartridge is pushed in. Since the tablet rider 960 sits on the stack of tablets and the cartridge is full when being pushed in, the thrust bracket is also pushed upward as far as the upper end of the central web. In this way, the two constant-force springs 320, 330 are tensioned, such that the thrust bracket is subject to a downwardly directed spring tension. This tension is transferred via the tablet rider to the stack of tablets.

Figure 5A:
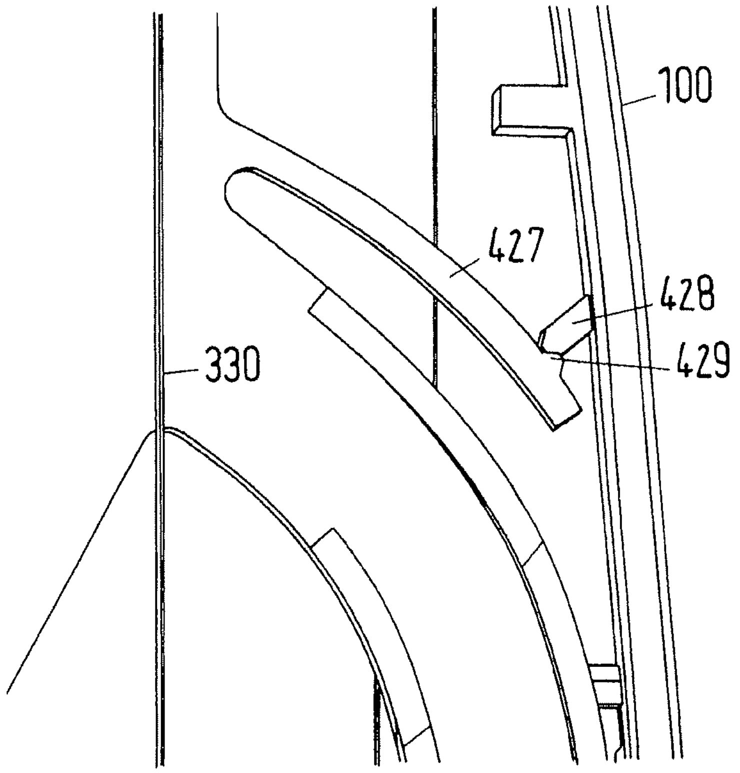
FIG. 5A shows, like FIG. 1, a detail of the pressure point on the left-hand locking lever.
Figure 7:
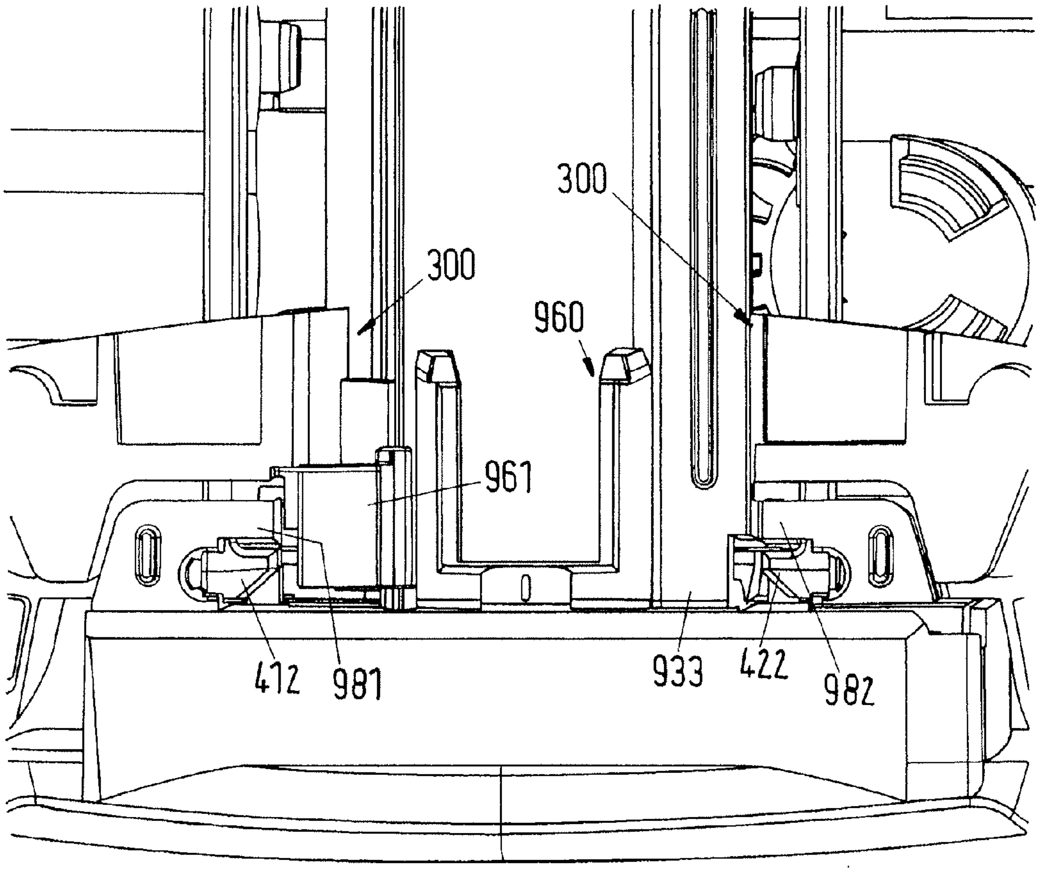
FIG. 7 shows a detail of the dispenser without outer skin seen from the rear, with the locks for the cartridge.
Figure 7A:
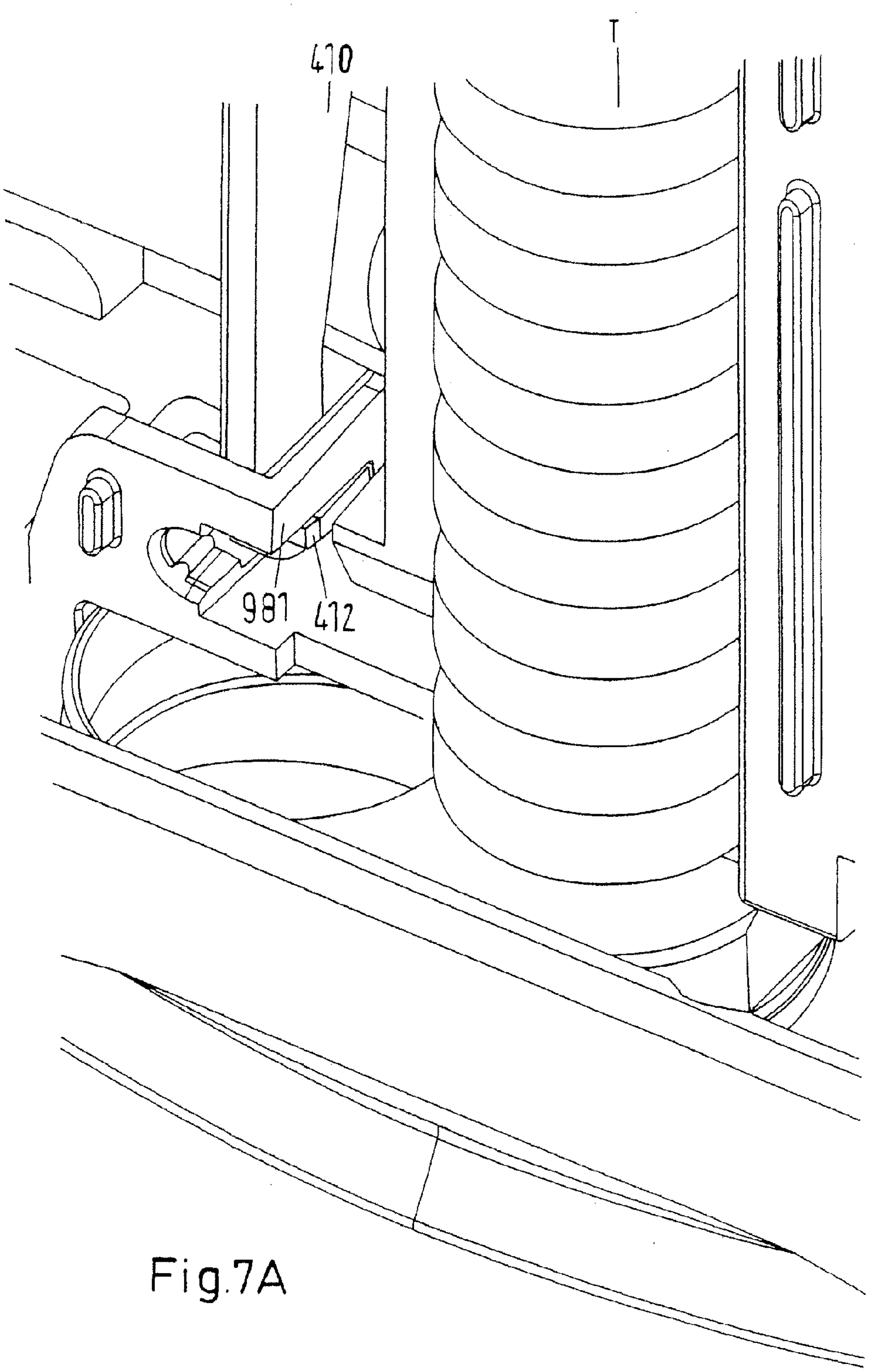
FIG. 7A shows a view as in FIG. 7, being a perspective detail of the left-hand part of the dispenser, with locked cartridge.
Figure 7B:
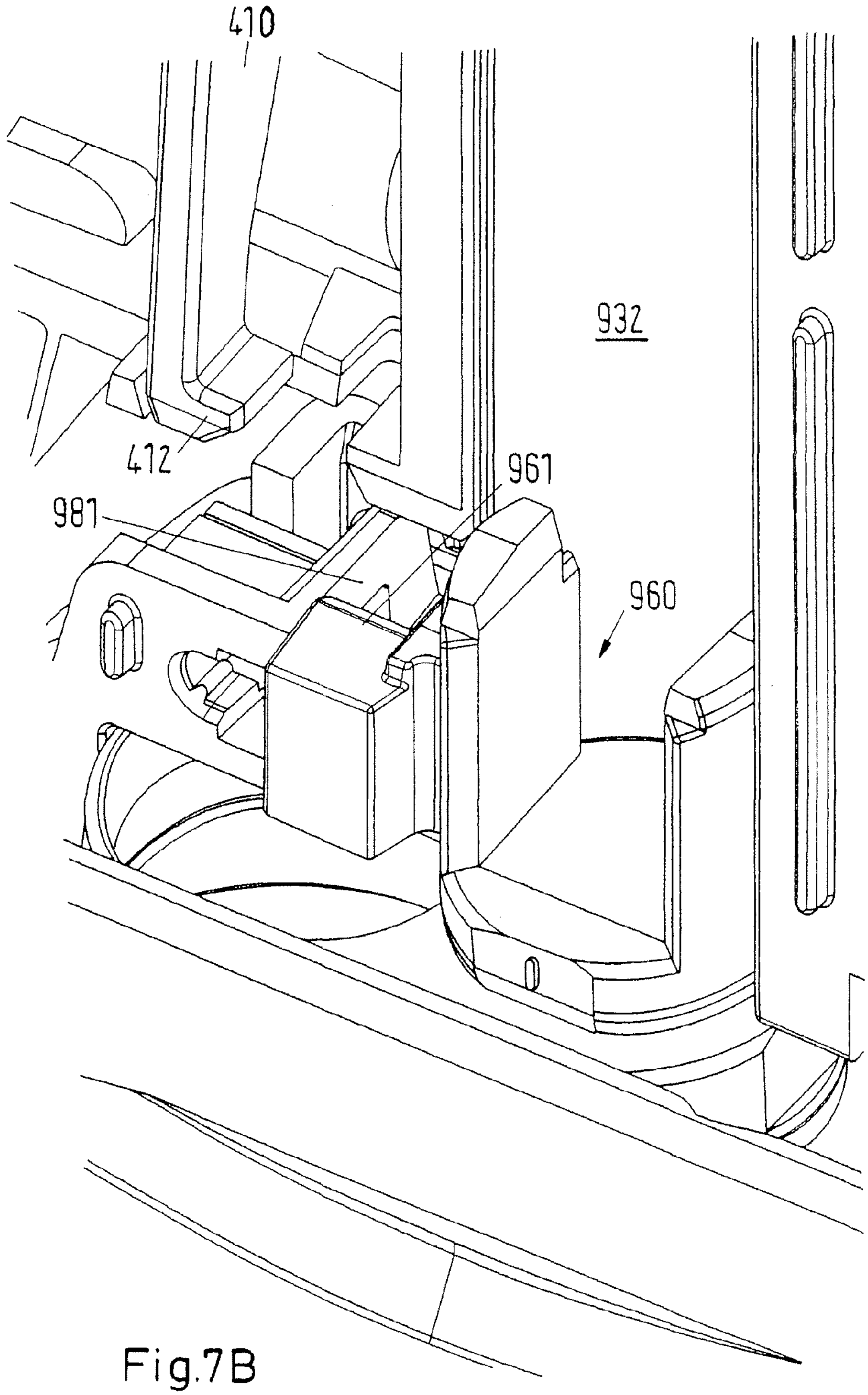
FIG. 7B shows the same as FIG. 7A, with the cartridge unlocked.

When the cartridge 900 is pushed into the receiving shaft 150 of the dispenser 1, the cartridge is locked in the dispenser. For this purpose, a left-hand locking lever 420 and a right-hand locking lever 410 are provided for the cartridge. The locking levers are mounted on the housing interior framework 100 at pivot points 415, 425. Locking lugs 412, 422 are provided at the respective lower ends of the locking levers (FIGS. 7, 7A, 7B). These locking lugs 412, 422 engage in corresponding eyelets 981, 982 on the housing front shell 932 of the cartridge (FIGS. 7A, 7B) when the lower legs of the locking levers and therefore the locking lugs of the locking levers are tilted inward (FIG. 5; see inwardly directed arrows). This tilting movement is brought about by the fact that the thrust bracket 300, upon insertion of the cartridge into the dispenser, is pushed upward on the central web 110 of the housing interior framework and, in the upper area, then slides along the run-on surfaces 416, 426 of the locking levers and thus forces the locking levers apart from each other at the top. In this way, the upper legs of the locking levers are pivoted outward, and the lower legs are thus pivoted inward. Spring arms 417, 427, which are formed integrally on the locking levers above the respective pivot points, are snapped in behind associated projections 419, 429 on the housing interior framework via corresponding pressure points 418, 428, such that the locking levers are held fixedly in this position (FIG. 5A). Therefore, after a full cartridge has been pushed in, the locking levers are arrested in the locked position, such that the cartridge can no longer be removed without auxiliary means. This ensures that, after being inserted into and locked in the dispenser, a cartridge cannot be removed again, as long as the cartridge is completely full upon insertion, since the thrust bracket is pushed up as far as the run-on surfaces of the locking levers and thus transfers these to the locked position. This locking action is maintained until the cartridge is completely empty.

To be able to eject an empty cartridge from the dispenser, an ejection mechanism is provided which cancels the block caused by the locking levers. Details of this ejection mechanism are shown in FIGS. 8A, 8B, 8C, 8D and 8E.

To be able to eject the cartridge, a release lever 500 is provided which is located directly behind the ejection slide 600 comprising the ejection button 19 (concealed). The release lever is fixed by means of a leg spring 510 (FIGS. 8C, 8D) in a substantially perpendicular position. For this purpose, the release lever is mounted, by way of pins 520, 520', on the housing front shell 11.1 in claws 121, 122, which are integrally formed on the housing front shell 11.1. The release lever is pivotable in the claws (arrows in FIGS. 8A, 8B, 8C, 8D), but only counter to the spring force of the leg spring.

The release lever 500 blocks the ejection slide 600, and thus the ejection button 19, by virtue of the fact that catch lugs 531,532 (or alternatively just a single catch lug) lie in front of corresponding projections 611, 612 of the ejection slide (or alternatively in front of just a single projection) in the rest position of the release lever and block the downward translation movement of the slide (ejection block). FIG. 8C shows the ejection slide blocked by the release lever, while the ejection slide in the view in FIG. 8D is unlocked and already pushed down.

Figure 8B:
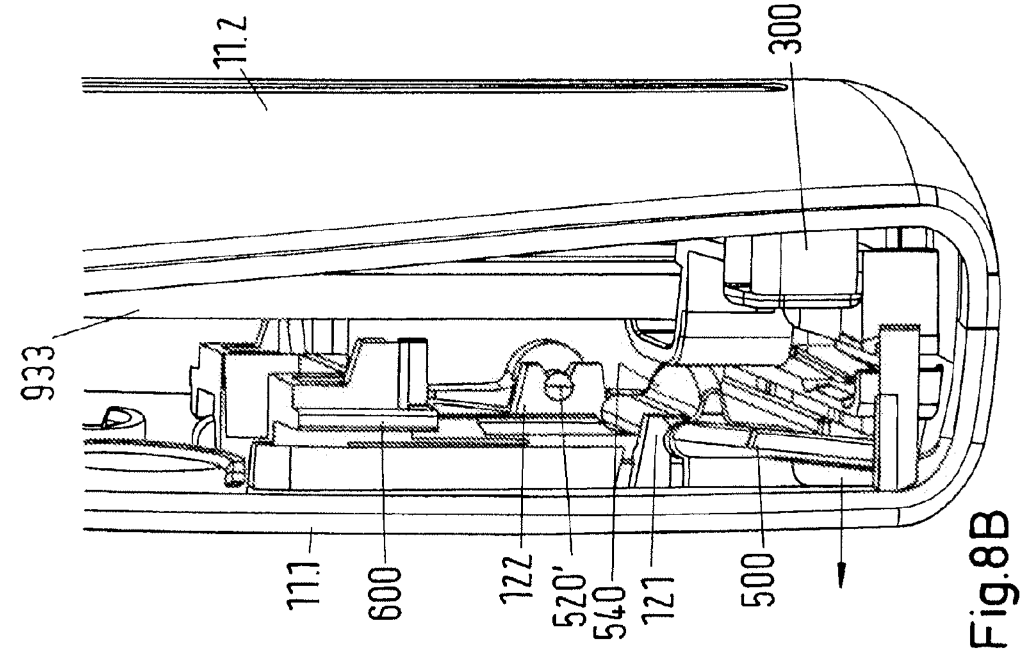
FIG. 8B shows the same as FIG. 8A, with the cartridge empty.
Figure 8A:
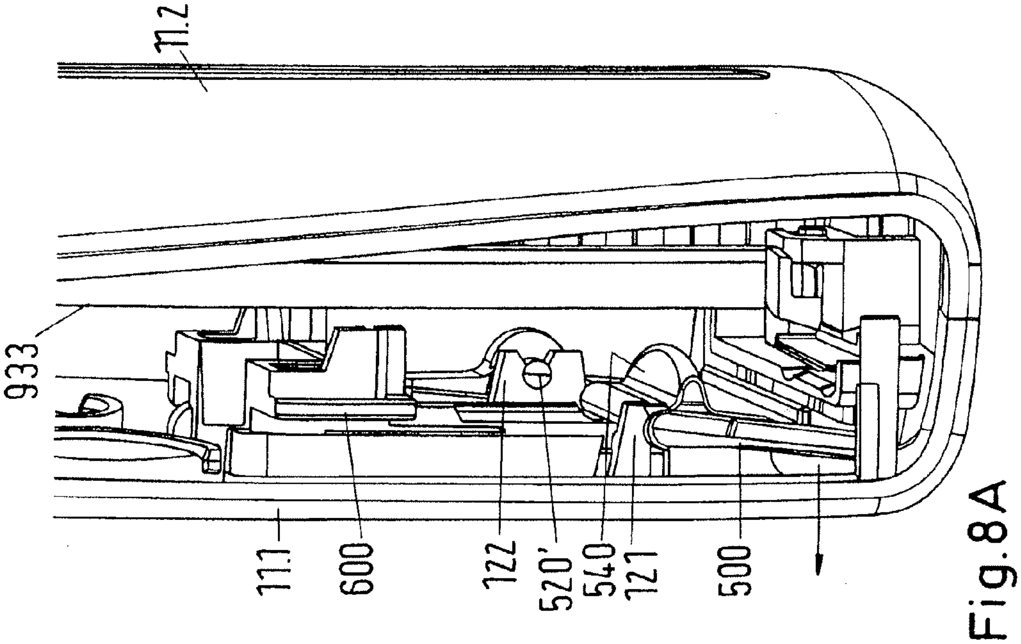
FIG. 8A shows a perspective partial view of the lower part of the dispenser without the lateral housing part, with the ejection button and the release button when the cartridge is full, seen from the right-hand side.
Figure 8C:
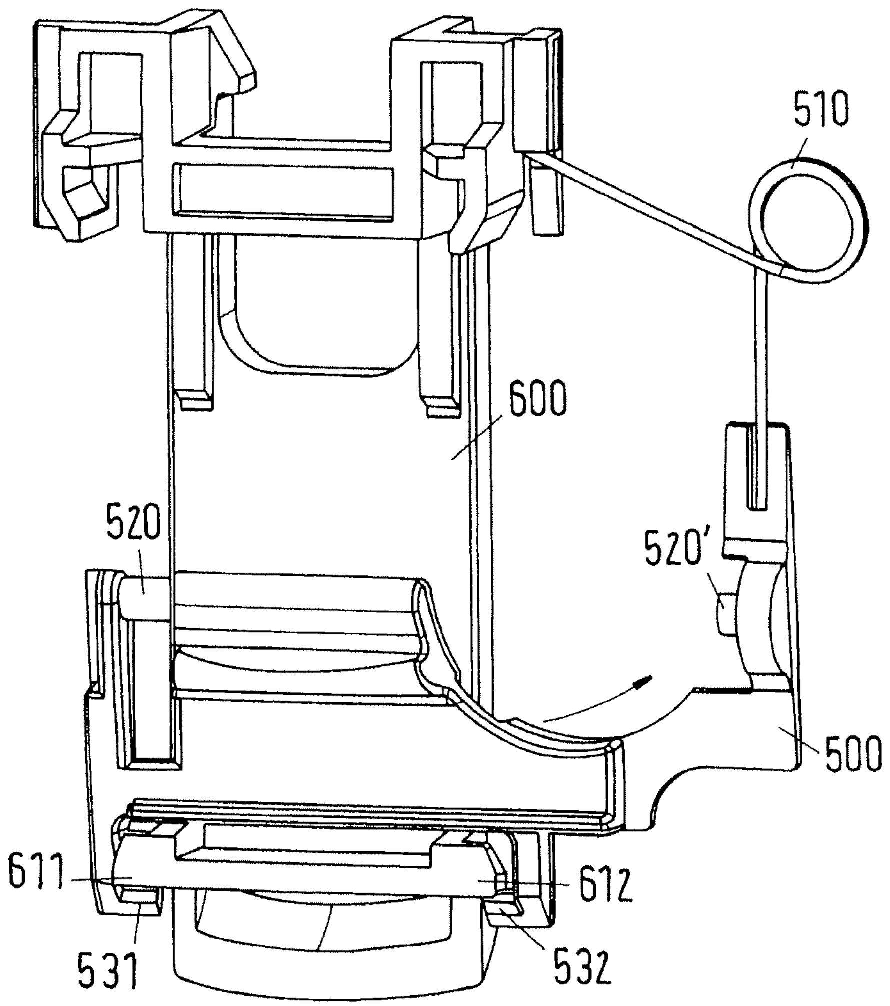
FIG. 8C shows a perspective view of the release button with leg spring and ejection slide, seen from the rear.
Figure 8D:
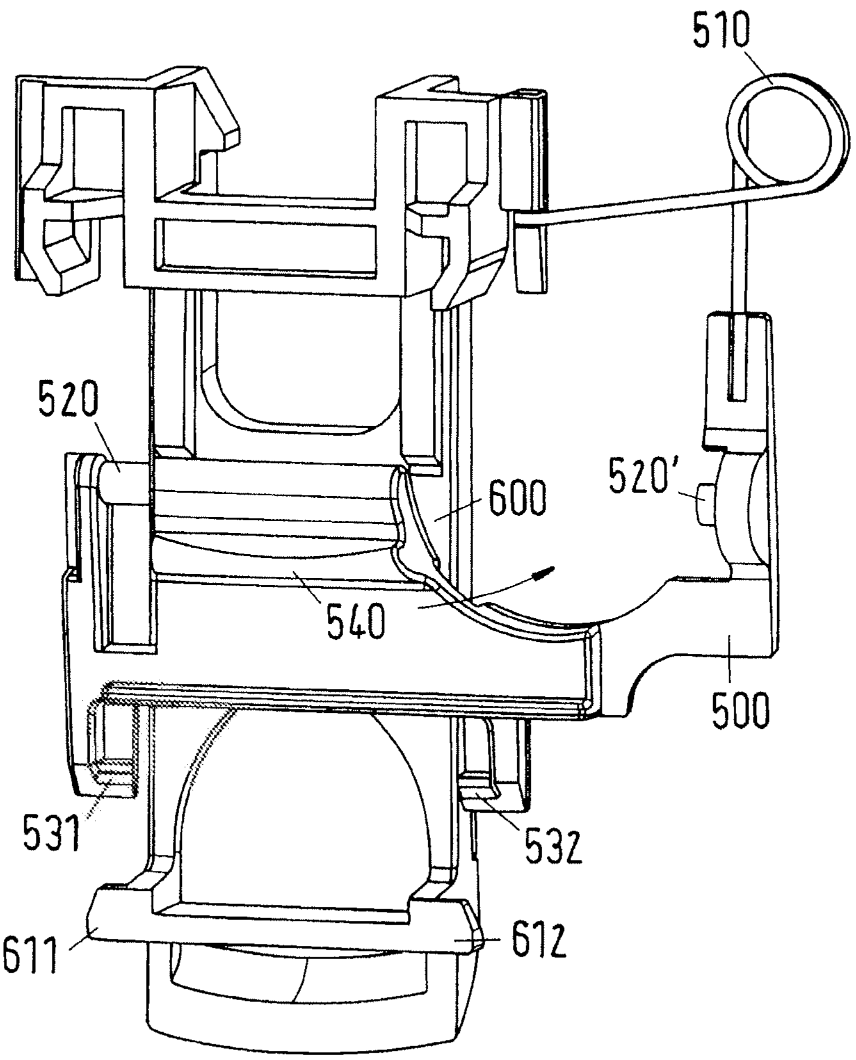
FIG. 8D shows the same as FIG. 8C, upon ejection of the cartridge.

As the cartridge 900 empties as a result of tablets T being dispensed, the thrust bracket 300 in the dispenser 1 slides downward (FIG. 8B). When the thrust bracket has reached the lowermost position during the stroke for the last tablet in the cartridge, it engages the lever 540 of the release lever 500 and tilts the latter forward, with its lower end, counter to the spring force of the leg spring 510 (FIG. 8B; arrow). In this way, the release lever frees the ejection slide 600, with the catch lugs 531, 532 being moved away from the corresponding projections 611, 612 of the ejection slide.

Figure 8E:
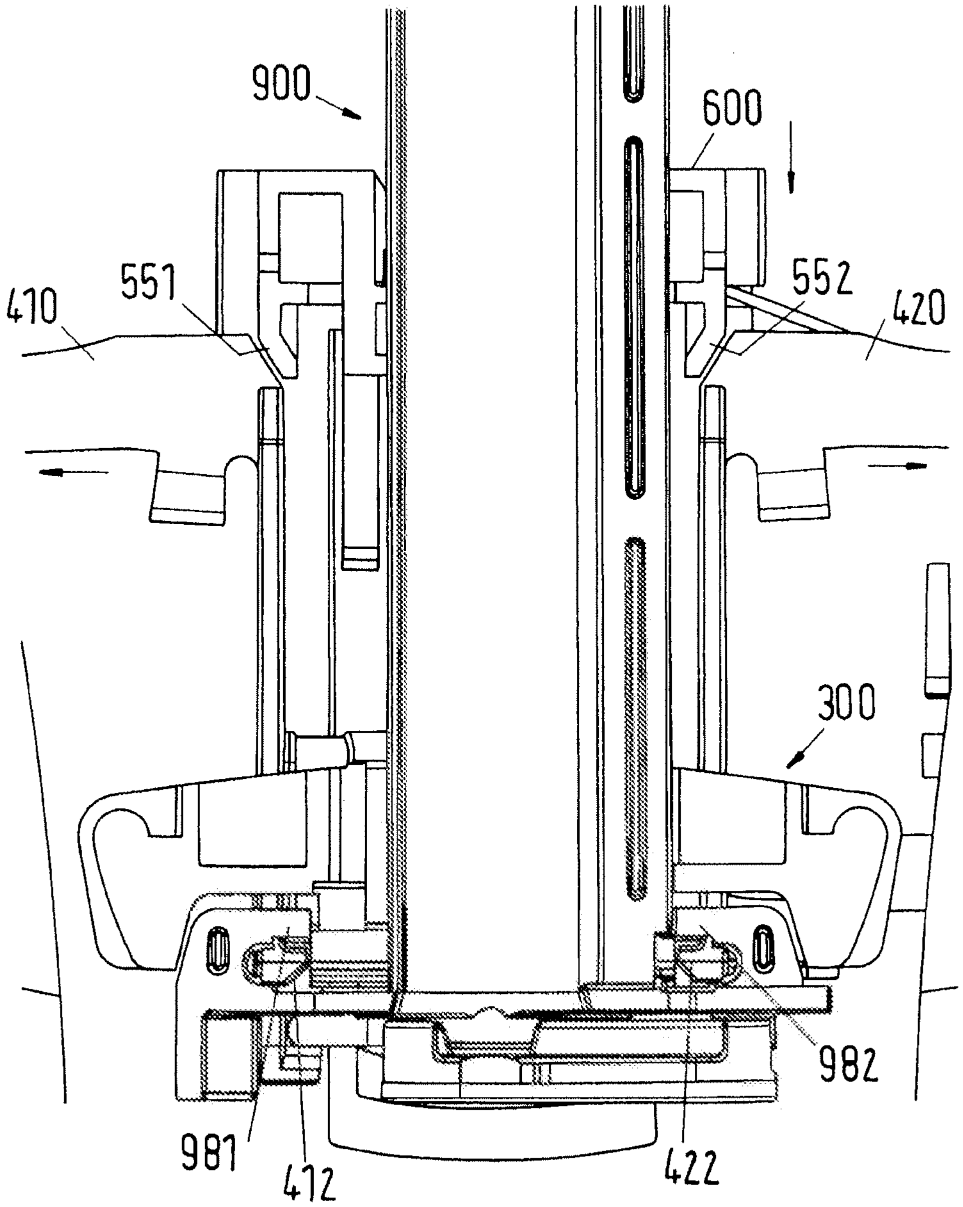
FIG. 8E shows a section through the dispenser without the front part and back part of the housing, seen from the rear.

The function of the locking levers 410, 420 upon release of the cartridge 900 is shown in FIG. 8E. The locking of the cartridge is cancelled by the ejection slide 600 being pushed down by about 2 mm (arrow). In doing so, the run-on surfaces 551, 552 of the ejection slide come into contact with the lower legs of the locking levers 410, 420, such that these are pressed outward (arrows). In this way, the locking lugs 412, 422 of the locking levers are pressed outward and released from the eyelets 981, 982 of the cartridge. The cartridge is released in this way. By further downward movement of the ejection slide, the cartridge can now be ejected in a downward direction. For this purpose, the catch lugs of the ejection slide act at the same time as ejection lugs, since they engage on the edge of the top face of the cartridge bottom shell 920 and press this down as a result of the downwardly directed movement. The cartridge can then be gripped by hand and withdrawn from the receiving shaft 150 of the dispenser 1. After actuation, the ejection slide returns again to the original position under a spring force. The leg spring 510 serves this purpose.

The dispenser 1 has an electronic display 16 and two electronic operating buttons 17, 18 (FIG. 1A). The electronic display is used to display the number of tablets T located in the cartridge 900, and the status of tablet administration, i.e. whether the first administration phase of 24 days has or has not yet elapsed and, if the former is the case, the number of days that have already elapsed in the second flexible administration phase. It is also possible to display whether, during the administration phase, a tablet has not been taken within a defined time interval. In addition, the display can also show how many days have already elapsed in an administration-free phase that may have been introduced. Moreover, the display can show a battery status. The operating buttons can be used to select the move to the administration-free phase and to choose from various menu options.

Figure 9:
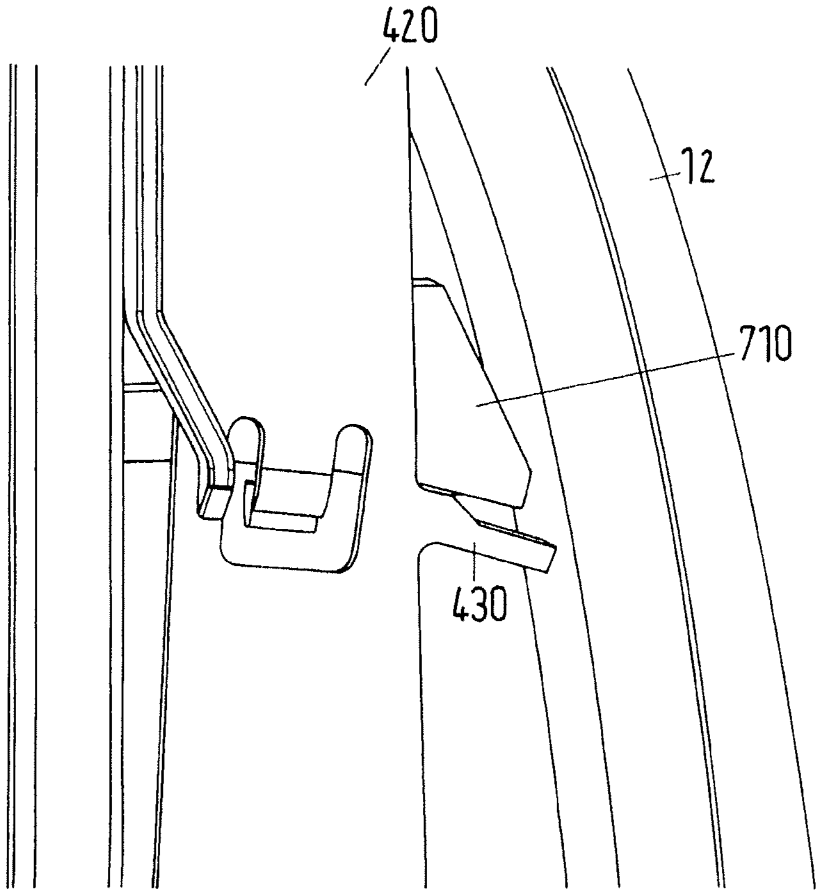
FIG. 9 shows a detail of the dispenser, seen from the rear.

The dispenser 1 contains batteries 1010, 1020 (FIGS. 2, 5) (alternatively also just a single battery) that are designed to maintain the functionality of the dispenser 1 for as long as possible without the need to replace them. Therefore, the dispenser contains an initializing switch 710, which starts it up when a cartridge 900 is pushed into the dispenser for the first time and which is arranged on the housing interior framework (FIG. 9). This switch is formed by a switch branch 430 of the left-hand locking lever 420, on the upper arm thereof. When the cartridge is pushed in, it pushes the upper arm of the left-hand locking lever outward, because the thrust bracket 300 slides along the run-on surface 426 on the upper arm of this locking lever and in so doing presses the arm outward (FIG. 5). The switch branch formed integrally on the left-hand locking lever is pressed against the initializing switch and actuates it. The actuation of this switch initializes the electronics, hitherto present in a rest position without power consumption, and, by virtue of the special construction of the initializing switch, the electronics remain switched on even after the withdrawal of the cartridge.

At the same time as the electronics are initialized when a cartridge 900 is pushed into the dispenser 1 for the first time, a second switch (not shown) located next to the initializing switch 710 is activated and remains switched on only for as long as the upper arm of the right-hand lock is pressed outward, i.e. for as long as the cartridge remains in the dispenser. After the cartridge has been removed, this second switch is switched off again by the inward pivoting of the upper arm of the locking lever 420. This second switch signals to the electronics that a cartridge is located in the dispenser. In this way, the number of tablets T located in the dispenser can be calculated, specifically on the basis that there is always a defined number of tablets T in a full cartridge, for example 30 tablets, and also by a further signal which is forwarded to the electronics and with which each removal of a tablet from the dispenser is registered. Moreover, when an empty cartridge is removed from the dispenser and a full cartridge is inserted, the further signal from the second switch also informs the electronics that a completely full cartridge is now once again located in the dispenser.

The further signal with which removal of a tablet T from the dispenser 1 is registered is generated by a third switch (not shown) which is located in the area of one of the transport levers 210, 220 and which, upon each actuation of the transport levers, is switched and thus generates this further signal. The dispenser 1 further contains a fourth switch (not shown) which is located in the lower area of the receiving shaft 150 and with which the sliding past of the thrust bracket 300 is registered and conveyed as an additional signal to the electronics.

Shortly before final emptying of the cartridge 900, for example when only five tablets T are left in the cartridge, this fourth switch is used to forward to the electronics a signal concerning the number of tablets remaining in the cartridge. This is defined by the exact spatial positioning of this fourth switch on the receiving shaft, as a result of which the fourth switch is actuated by removal of a tablet only when there is still a predetermined number of tablets in the cartridge. This verification count may be necessary in order to correctly display to the user how many tablets are still located in the cartridge when there are just a few of them. This ensures that no false assumption is made regarding the number of remaining tablets, since it could be critical if the user were not warned in good time of the cartridge having been emptied. This precautionary measure is advantageous when the degree to which a cartridge is filled with tablets cannot be safely verified by all the control measures in place during the filling sequence. This is because the height of an individual tablet has a tolerance, with the result that the height of the stack of tablets can also fluctuate. In any case, however, the user can determine by way of the window 20 in the housing rear shell 11.2 whether there are still tablets left in the cartridge.

It will be appreciated that the examples and embodiments described here serve only for illustration and that various modifications and amendments to the examples and embodiments, and also combinations of other features described in this application, will be immediately apparent to a person skilled in the art and fall within the disclosure of the invention described here and within the scope of protection of the claims. All patents and patent applications referred to here are hereby incorporated in the disclosure of the application.

The invention claimed is:

1. A cartridge that can be inserted into a medicament dispenser for solid medicament portions, the cartridge comprising a reservoir for receiving medicament portions, the cartridge further comprising a transport safety mechanism for preventing movement of the medicament portions during storage and transport of the cartridge, the transport safety mechanism comprising a tolerance compensation plug and a tablet rider, the tolerance compensation plug sitting with a frictional fit in the reservoir and being movable in the axial direction, the tolerance compensation plug comprising at least one locking means for locking onto a profile located on an inside wall of the reservoir, the tablet rider being movable in an axial direction in the reservoir and engaging a biasing force through at least one axial slit in the cartridge and with which a force acting in the axial direction is transferred to the medicament portions in the cartridge, thus serving to hold down a column-shaped arrangement of medicament portions, whereby the tolerance compensation plug is pressed onto the column-shaped arrangement of medicament portions and the tablet rider.

2. A method for storage of medicament portions comprising using a cartridge of claim 1.

3. The method as claimed in claim 2, characterized in that the medicament portions are hormone preparations.

4. The cartridge as claimed in claim 1, characterized in that the at least one locking means is formed by at least one outwardly acting spring element with locking lugs that locks onto a profile.

5. The cartridge as claimed in claim 1, characterized in that the cartridge is designed to dispense the medicament portions in the axial direction.

6. The cartridge as claimed in claim 1, characterized in that the tablet rider serves to entrain a thrust means located in the medicament dispenser.

7. The cartridge of claim 1, wherein the at least one locking means comprises spring elements with locking lugs, and the profile comprises ratchet tracks in which the locking lugs engage.

8. A medicament dispenser for solid medicament portions comprising an exchangeable cartridge contained therein, which medicament dispenser has receiving means for the cartridge, and which cartridge comprises a reservoir for receiving the medicament portions and further comprises a transport safety mechanism for preventing movement of the medicament portions during storage and transport of the cartridge, the transport safety mechanism comprising a tolerance compensation plug and a tablet rider, the tolerance compensation plug sitting with a frictional fit in the reservoir and being movable in the axial direction, the tolerance compensation plug comprising at least one locking means for locking onto a profile located on an inside wall of the reservoir, the tablet rider being movable in an axial direction in the reservoir and engaging a bias force through at least one axial slit in the cartridge and with which a force acting in the axial direction is transferred to the medicament portions in the cartridge, thus serving to hold down a column-shaped arrangement of medicament portions, whereby the tolerance compensation plug is pressed onto the column-shaped arrangement of medicament portions and the tablet rider.

9. The medicament dispenser for solid medicament portions, with an exchangeable cartridge contained therein, as claimed in claim 8, characterized in that the receiving means for the cartridge are in the form of a receiving shaft which extends in the axial direction and is designed for insertion of the cartridge, and the reservoir is designed to receive the medicament portions in a column-shaped arrangement.

10. The medicament dispenser solid medicament portions, with an exchangeable cartridge contained therein, as claimed in claim 8, characterized in that at least one elastic means is provided in the medicament dispenser, upon insertion of the cartridge into the medicament dispenser, exerts an elastic force on the cartridge in the axial direction counter to a direction in which the cartridge is inserted into the medicament dispenser.

11. The medicament dispenser for solid medicament portions, with an exchangeable cartridge contained therein, as claimed in claim 10, characterized in that the at least one elastic means is formed by at least one constant-force spring.

12. The medicament dispenser for solid medicament portions, with an exchangeable cartridge contained therein, as claimed in claim 8, characterized in that the medicament dispenser has a thrust means which moves along the receiving shaft and which transfers an elastic force to the medicament portions contained in the cartridge.

13. The medicament dispenser for solid medicament portions, with an exchangeable cartridge contained therein, as claimed in claim 8, characterized in that the tablet rider serves to entrain the thrust means located in the medicament dispenser.

14. The medicament dispenser for solid medicament portions, with an exchangeable cartridge contained therein, as claimed in claim 8, characterized in that the medicament dispenser and the cartridge are designed to dispense the medicament portions in an axial direction.

15. A method for storing and dispensing medicament portions comprising using the medicament dispenser for solid medicament portions, with the exchangeable cartridge contained therein, as claimed in claim 8.

16. The medicament dispenser claim 8, wherein the at least one locking means comprises spring elements with locking lugs, and the profile comprises ratchet tracks in which the locking lugs engage.

* * * * *